US008346094B2

(12) United States Patent
Hamana et al.

(10) Patent No.: US 8,346,094 B2
(45) Date of Patent: Jan. 1, 2013

(54) OPTICAL TRANSMISSION SYSTEM AND ELECTRONIC DEVICE USING THE SAME

(75) Inventors: Kentaro Hamana, Nara (JP); Naru Yasuda, Uji (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 469 days.

(21) Appl. No.: 12/621,150

(22) Filed: Nov. 18, 2009

(65) Prior Publication Data
US 2010/0129073 A1 May 27, 2010

(30) Foreign Application Priority Data
Nov. 21, 2008 (JP) ................................ 2008-298644

(51) Int. Cl.
H04B 10/00 (2006.01)
(52) U.S. Cl. .......................... 398/136; 398/154; 398/161
(58) Field of Classification Search .......... 398/135–137, 398/154, 155, 161, 158
See application file for complete search history.

(56) References Cited

U.S. PATENT DOCUMENTS

| 8,130,887 B2* | 3/2012 | Cranford et al. ............ 375/355 |
| 2002/0044325 A1* | 4/2002 | Noguti ........................ 359/189 |
| 2002/0054409 A1* | 5/2002 | Bartur et al. .................. 359/152 |
| 2003/0165207 A1 | 9/2003 | Noguchi et al. |
| 2008/0175344 A1 | 7/2008 | Menolfi et al. |
| 2008/0279550 A1* | 11/2008 | Mahlab .......................... 398/25 |

FOREIGN PATENT DOCUMENTS

| JP | 2003258924 A | 9/2003 |
| JP | 2007-124130 A | 5/2007 |
| WO | 2005060655 A2 | 7/2005 |

OTHER PUBLICATIONS

Extended European Search Report for Application No. 09175784.9, mailed on May 4, 2010 (6 pages).
Office Action Issued in Japanese Application No. 2008-298644, Dated Jun. 19, 2012 (5 Pages With English Translation).

* cited by examiner

Primary Examiner — Dalzid Singh
(74) Attorney, Agent, or Firm — Osha Liang LLP

(57) ABSTRACT

A light transmission system has a light transmission module having a light transmission path that transmits a data signal as an optical signal, wherein the light transmission module converts the optical signal transmitted through the light transmission path to an electrical signal and outputs the converted optical signal as a binarization signal, an electrical transmission path that outputs a clock signal as a binarization signal, a reception processing unit that performs a reception process on each of the data signal and the clock signal, and a first delay unit that delays a rise start time of the clock signal with respect to a rise start time of the data signal for the binarization signal. A delay amount of the clock signal by the first delay unit is a time less than or equal to a maximum value of a data dependency jitter (DDJ).

15 Claims, 21 Drawing Sheets

RISE START TIME

BODY SIDE SUBSTRATE                    PRINTER HEAD

OPTICAL TRANSMISSION SYSTEM AND ELECTRONIC DEVICE USING THE SAME

BACKGROUND OF THE INVENTION

1. Technical Field

The present invention relates to a light transmission system and an electronic device equipped with the same.

2. Related Art

In recent years, increase in the data transmission speed between an LCD (Liquid Crystal Display) and an application processor is desired with higher definition of the LCD of a portable telephone. Reduction in the number of wirings for data transmission is also desired with thinning of the portable telephone. Based on such background, serial transmission is starting to be widely used in place of the conventional parallel transmission as a method of transmitting data between the LCD and the application processor. Currently, data signals and clock signals are both transmitted in a differential transmission method in the serial transmission that is being most widely used. In such serial transmission, unnecessary radiation (EMI; Electromagnetic Interference) is becoming more and more serious in recent years. Thus, the clock signals are transmitted at low speed to reduce the EMI. In such transmission method, the there is EMI from high speed data signal.

A method of connecting the LCD and the application processor with a light guide and the like, and transmitting the data signal as an optical signal is being considered.

The light guide has a double structure of a center core, which is called a core, and a capsule, which is called a clad, where the index of refraction of the core is higher than that of the clad. The optical signal entered to the core is propagated by being totally reflected repeatedly inside the core.

Through the use of the light transmission module, large capacity data signals can be transmitted at high speed from a main control board to an application circuit board mounted in the portable telephone. The light transmission module thus excels as a data transmission module.

When transmitting the data signal as an optical signal and transmitting the clock signal as an electrical signal, a large delay is generated between signals at a light receiving unit 3. Thus, there is skew (temporal shift) adjustment between the data signal and the clock signal compared to a module of electrically transmitting both the data signal and the clock signal.

A delay amount of the clock signal is accumulated in a memory on a transmission device side, and the clock signal is transmitted with delayed by the delay amount accumulated in the memory to adjust the delay in Japanese Unexamined Patent Publication No. 2007-124130 (date of publication: May 17, 2007). FIG. 22 is a block diagram showing a configuration of a transmission and reception device described in Japanese Unexamined Patent Publication No. 2007-124130.

As shown in the figure, a transmission device 200 includes a transmitting unit 214, a drive unit 216, a laser diode 218, a delay unit 222, and a delay information holding unit 224. The transmitting unit 214 transmits the data signal and the clock signal to each transmission path of an optical fiber 232 and a clock transmission line 234. The drive unit 216 supplies drive current to the laser diode 218. The delay unit 222 delays the clock signal by a time corresponding to a phase difference signal transmitted from a reception side. The delay information holding unit 224 holds data showing the delay time to be delayed by the delay unit 222. In the transmission and reception device of Japanese Unexamined Patent Publication No. 2007-124130, the delay unit 222 delays the clock signal based on the data, which shows the delay time calculated from a wiring length, accumulated in a memory 240 of the delay information holding unit 224 to adjust the delay between the data signal and the clock signal.

SUMMARY

Normally, the optical signal (data signal) transmitted through the light transmission module is coded by 8B10B etc. to avoid bit continuation. In the transmission and reception device of Japanese Unexamined Patent Publication No. 2007-124130, the timing with the clock signal can be matched with respect to the data signal coded in such manner.

However, in the data transmission in the electronic device such as the portable telephone, the data signals are often not coded and data dependency jitter (DDJ) due to bit continuation occurs. Thus, if the transmission and reception device of Japanese Unexamined Patent Publication No. 2007-124130 is applied to the data transmission in the electronic device such as the portable telephone, the timing of the data signal and the clock signal becomes difficult to be matched due to the influence of the DDJ.

FIG. 23 is a schematic view schematically showing the occurrence of the data dependency jitter (DDJ) due to bit continuation. As shown in the figure, fluctuation occurs in the timing of the rise of the signal when the same value (e.g., "0") continues in the data signal transmitted through an optical wiring of the light transmission module. The data dependency jitter (DDJ) is the fluctuation in time of the rise of the signal. As shown in the figure, the data dependency jitter becomes greater as a bit continuation length of the same value in the data signal becomes longer.

FIG. 24A is a timing chart showing a relationship of a data signal in which the data dependency jitter has not occurred and a clock signal, and FIG. 24B is a timing chart showing a relationship of a data signal in which the data dependency jitter has occurred and a clock signal.

As shown in FIG. 24A, if the data dependency jitter has not occurred in the data signal, the variation in signal becomes a symmetrical distribution such as the process variation and the operation condition variation of the delay unit 222 (delay circuit) by making an adjustment of matching the timing of the data signal and the clock signal as in the technique described in Japanese Unexamined Patent Publication No. 2007-124130.

As shown in FIG. 24B, if the data dependency jitter has occurred in the data signal, the timing of the rise of the data signal fluctuates in a delaying direction (direction (a)) on a time axis t with increase in the bit continuation. When adjusting the delay amount of the clock signal using the technique of Japanese Unexamined Patent Publication No. 2007-124130 with respect to the data signal in which the timing fluctuates asymmetrically, the adjustment causes a large variation on one side, as shown in FIG. 24B. Thus, it is difficult to accurately match the timing of the clock signal using the technique of Japanese Unexamined Patent Publication No. 2007-124130 with respect to the data signal in which the data dependency jitter has occurred.

In such case, if the timing of the data signal and the clock signal are matched based on the delay time and the like calculated from the electrical wiring length as in Japanese Unexamined Patent Publication No. 2007-124130, the quality of the communication degrades due to the influence of the DDJ.

If the timing time of the rise of the data signal is greatly off due to the influence of the data dependency jitter, there is a limit with only the adjustment of the delay time by the IC circuit.

One or more embodiments of the present invention provides a light transmission system capable of suppressing the influence of fluctuation in timing due to the data dependency jitter with respect to a non-coded data signal and realizing a satisfactory data transmission quality, and an electronic device equipped with the same.

In accordance with one aspect of the present invention, a light transmission system includes: a light transmission module, including a light transmission path for transmitting a data signal as an optical signal, for converting the optical signal transmitted through the light transmission path to an electrical signal and outputting the converted optical signal as a binarization signal; an electrical transmission path for outputting a clock signal as a binarization signal; and a reception processing unit for performing a reception process on each of the data signal and the clock signal; wherein a first delay unit for delaying a rise start time of the clock signal with respect to a rise start time of the data signal for the binarization signal is arranged, a delay amount of the clock signal by the first delay unit being a time of smaller than or equal to a maximum value of a data dependency jitter (DDJ). The "rise start time" referred to herein is the timing the binarization signal output from the reception processing unit rises.

According to the above configuration, the first delay unit for delaying the rise start time of the clock signal with respect to the rise start time of the data signal for the binarization signal is arranged, where the delay amount of the clock signal by the first delay unit is a time smaller than or equal to a maximum value of the data dependency jitter (DDJ). In other words, the clock signal is delayed with respect to the data signal in advance, and the delay amount thereof is adjusted to smaller than or equal to the maximum value of the data dependency jitter (DDJ). Since the clock signal is set to be delayed by a constant time with respect to the data signal, the distribution of the rise start time of the data signal due to the data dependency jitter with respect to the rise start time of the clock signal becomes a symmetrical distribution. As a result, the influence of fluctuation in timing due to the data dependency jitter can be suppressed, and a satisfactory data transmission quality can be realized even for the non-coded data signal.

In the light transmission system according to one or more embodiments of the present invention, when fluctuation in a rise time of the data signal is a sum of a jitter (deterministic jitter) of deterministic component and a jitter (random jitter) of random component, the jitter of deterministic component is a discrete function distributed according to a peak of a δ function defined for every number of bit continuations N of the data signal; and the delay amount is set between a peak time of a δ function in number of bit continuations 2 and a peak time of a δ function in number of bit continuations N−1.

According to the above configuration, the sum of the jitter of deterministic component serving as a discrete function and the jitter of random component becomes a distribution showing the fluctuation in the rise time of the data signal. With respect to such distribution, if the timing of the clock signal is matched to the peak time of the δ function in the number of bit continuations 1, as in the prior art, the constant bit error rate in the delaying direction becomes large, and satisfactory transmission characteristics become difficult to achieve.

According to the above configuration, the delay amount of the clock signal is set between the peak time of the δ function in the number of bit continuations 2 and the peak time of the δ function in the number of bit continuations N−1, and thus the influence due to the data dependency jitter (DDJ) can be suppressed even if the number of bit continuations of the data signal is increased.

In the light transmission system according to one or more embodiments of the present invention, the light transmission module includes: an amplifier for amplifying the converted electrical signal, and a first binarization signal generation unit for comparing a level of an input signal and a level of a first threshold value, and generating a binarization signal having a signal of high level and a signal of low level for the data signal based on a comparison result; wherein a maximum value DDJ(max) of the data dependency jitter (DDJ) is expressed with following equation (1)

$$DDJ(\text{max}) = \frac{5}{6} \times tr \times \frac{V_{th}}{V_{in}} \times \frac{1}{G_{max}\left\{\frac{G_{max}}{\alpha \log(N f_{min}/f_T)} - 1\right\}} \quad (1)$$

where $V_{in}$ is ½ of a voltage amplitude of the electrical signal input to the amplifier, $V_{th}$ is the first threshold value, $G_{max}$ is a maximum value of a gain of the amplifier, a is an increasing rate of a gain with respect to a transmission frequency in the amplifier, $f_T$ is a fundamental frequency of the data signal, $f_{min}$ is a transmittable rate of the light transmission module, tr is the rise time of the data signal, and N is a maximum value of the number of continuing bits in the data signal.

As the maximum value DDJ(max) of the data dependency jitter (DDJ) can be expressed as in equation (I), the DDJ(max) that is dependent on the maximum value N of bit continuations can be easily grasped and the variation of the signal can be more reliably made to a symmetrical distribution.

In the light transmission system according to one or more embodiments of the present invention the light transmission module includes: a light transmitting unit for converting the data signal to the optical signal, and transmitting the optical signal, and a light receiving unit for receiving the optical signal transmitted through the light transmission path, and converting the optical signal to an electrical signal; and the first delay unit is an electrical transmission path, a wiring length $L_2$ of the electrical transmission path satisfying equation (1)

$$T(ic1) + T(ic2) + \frac{nL_1}{c} + \frac{DDJ(\text{max})}{A} = \frac{L_2\sqrt{\varepsilon r}}{c} \quad (1)$$

where t(ic1) and t(ic2) are signal delay times with respect to the clock signal of the light transmitting unit and the light receiving unit, respectively, $L_1$ is a wiring length of the light transmission path, $L_2$ is a wiring length of an electrical transmission path, n is an index of refraction of the light transmission path, c is a speed of light, εr is a relative permittivity of the electrical transmission path, DDJ(max) is the maximum value of the data dependency jitter (DDJ), and DDJ(max)/A is the delay amount.

Based on the equation (1), the parameter necessary for delaying the output of the clock signal by the time of smaller than or equal to the data dependency jitter (DDJ) is only the wiring length $L_2$ of the electrical transmission path and the relative permittivity εr of the material configuring the electrical transmission path. Thus, compared to adjusting the delay amount of the clock signal using the conventional delay element or the IC, adjustment with small variation of the signal can be carried out.

In the light transmission system according to one or more embodiments of the present invention, the electrical transmission path is arranged parallel to a signal transmission direction of the light transmission path; the wiring length of the electrical transmission path is longer than the wiring length of the light transmission path; and an integrated substrate for integrating the electrical transmission path is arranged, a length in the signal transmission direction of the integrated substrate being equal to the wiring length of the light transmission path.

According to the above configuration, the electrical transmission path is integrated on the integrated substrate. Thus, the wiring length in the transmission direction in the integrated substrate is the same as the wiring length of the light transmission path. The influence of the fluctuation in timing of the clock signal output due to the data dependency jitter can be suppressed without influencing the outer shape and the width of the electrical transmission path by having the dimension in the transmission direction of the substrate same as the light transmission path. Thus, the space of the electrical transmission path can be saved.

In the light transmission system according to one or more embodiments of the present invention, the electrical transmission path is arranged to reciprocate at least once at one end in the signal transmission direction of the integrated substrate.

According to the above configuration, the electrical transmission path is arranged so as to reciprocate at least once at one end in the signal transmission direction of the integrated substrate. The delay amount of the clock signal can be adjusted with the number of reciprocations. The delay amount of the clock signal can be accurately adjusted by patterning such that the length of each reciprocation is different.

In the light transmission system according to one or more embodiments of the present invention, the integrated substrate includes a projection that projects out in the signal transmission direction than the light transmission path and that is mounted with the light transmission module; and the projection includes an electrical wiring layer in which an electrical wiring is pattern-formed, the electrical wiring of the electrical wiring layer and the electrical transmission path being connected.

According to the above configuration, the integrated substrate includes a projection that projects out in the signal transmission direction than the light transmission path and that is mounted with the light transmission module. The projection includes an electrical wiring layer pattern-formed with the electrical wiring. The electrical wiring of the electrical wiring layer and the electrical transmission path are connected. Therefore, the wiring length of the electrical transmission path can be made substantially long without changing the outer shape of the integrated substrate by adopting a configuration of separately arranging the projection on the integrated substrate and forming the electrical wiring layer in the projection.

The light transmission system according to one or more embodiments of the present invention further includes: a connector with a connector terminal; wherein a plurality of electrical transmission paths is coaxially arranged on the integrated substrate, each electrical transmission path being connected with the connector terminal; and the connector includes a connector short-circuit portion for short circuiting the connector terminals, the connector short-circuit portion being arranged to transmit the clock signal in a reciprocating manner on an input side and an output side of the electrical transmission path.

According to the above configuration, the connector includes a connector short-circuit portion for short circuiting the connector terminals. The connector short-circuit portion is arranged so that the clock signal is transmitted in a reciprocating manner on the input side and the output side of the electrical transmission path. With such configuration, the wiring length of the electrical transmission path can be made substantially long without changing the outer shape of the integrated substrate. Since the connector short-circuit portion is arranged between the connector terminals, the impedance of the electrical transmission path is stable. Thus, the waveform control of the clock signal is facilitated.

In the light transmission system according to one or more embodiments of the present invention, the delay amount is between ¼ and ¾ of the maximum value of the data dependency jitter (DDJ).

According to the above configuration, the influence by the data dependency jitter (DDJ) can be suppressed particularly with respect to the 8b10B coded data signal by setting the delay amount of the clock signal.

In the light transmission system according to one or more embodiments of the present invention, the delay amount is ½ of the maximum value of the data dependency jitter (DDJ).

Therefore, the rise start time of the clock signal is a time either later than or earlier than the rise start time of the clock signal, and the variation of the signal reliably becomes a symmetrical distribution.

In the light transmission system according to one or more embodiments of the present invention, the first delay unit includes a second binarization signal generation unit for comparing a level of the input signal and a level of a second threshold value, and generating a binarization signal having a signal of high level and a signal of low level for the clock signal based on a comparison result; and in the second binarization signal generation unit, the level of the second threshold value with respect to the clock signal is set higher than the level of the first threshold value with respect to the data signal.

According to the above configuration, since the level of the second threshold value with respect to the clock signal is set higher than the level of the first threshold value with respect to the data signal in the second binarization signal generation unit, the clock signal output from the second binarization signal generation unit is delayed with respect to the data signal.

The influence of the fluctuation in timing of the clock signal output due to the data dependency jitter can be suppressed by setting the first threshold value and the second threshold value such that the delay amount of the clock signal becomes a time smaller than or equal to the maximum value of the data dependency jitter (DDJ).

In the light transmission system according to one or more embodiments of the present invention, when the rise time tr and the amplitude of the data signal are equal to the rise time of the clock signal, ½ of the amplitude of the data signal and the clock signal is $V_{od}$, the difference between the first threshold value and the second threshold value is $\Delta V_{th}$, and the delay amount is $t_d$, the delay amount $t_d$ satisfies equation (2).

$$t_d = \frac{5}{6} \times tr \times \frac{\Delta V_{th}}{V_{od}} \qquad (2)$$

In the light transmission system according to one or more embodiments of the present invention, the first delay unit includes a second binarization signal generation unit for comparing a level of the input signal and a level of a threshold value, and generating a binarization signal having a signal of high level and a signal of low level for the clock signal based on a comparison result, and performs a process of extending the rise time of the clock signal to be longer than the rise time of the data signal with respect to the signal input to the second binarization signal generation unit.

According to the above configuration, the rise time of the clock signal is longer than the rise time of the data signal. That is, the data signal rises early compared to the clock signal. Thus, the clock signal input to the second binarization signal generation unit has a blunt waveform compared to the data signal. The clock signal output from the second binarization signal generation unit is delayed with respect to the data signal.

The delay unit performs a process of adjusting the rise time of the data signal and the clock signal such that the delay amount of the clock signal becomes a time smaller than or equal to the maximum value of the data dependency jitter (DDJ). The influence of the fluctuation in timing of the clock signal output due to the data dependency jitter thus can be suppressed. Furthermore, the reduction of the data dependency jitter and the compensation of the delay can be simultaneously realized. If the data signal rises early compared to the clock signal, the slew rate becomes large by such amount and the jitter becomes small.

In the light transmission system according to one or more embodiments of the present invention, the amplitudes of the data signal and the clock signal are equal to each other; and when ½ of the amplitude is $V_{od}$, the difference between the rise time of the data signal and the rise time of the clock signal is Δtr, the first threshold value is $V_{th}$, and the delay amount is $t_d$, the delay amount $t_d$ satisfies equation (3).

$$t_d = \frac{5}{6} \times \Delta tr \times \left(1 + \frac{V_{th}}{V_{od}}\right) \quad (3)$$

The light transmission system according to one or more embodiments of the present invention further includes: a second delay unit for delaying the rise start time of the clock signal; wherein the delay amount of the clock signal by the second delay unit is a difference between the delay amount of the data signal with respect to the clock signal at a lower limit temperature in a usable temperature range and the delay amount of the data signal with respect to the clock signal at a normal temperature in temperature characteristics of the light transmission module.

According to the above configuration, a second delay unit for delaying the rise start time of the clock signal is arranged, where the delay amount of the clock signal by the second delay unit is the difference between the delay amount of the data signal with respect to the clock signal at a lower limit temperature in a usable temperature range and the delay amount of the data signal with respect to the clock signal at a normal temperature in the temperature characteristics of the light transmission module, and thus a light transmission system capable of maintaining a satisfactory signal transmission quality over a wide temperature range can be realized.

In accordance with one aspect according to one or more embodiments of the present invention, an electronic device includes the above-mentioned light transmission system.

Therefore, the influence of the fluctuation in timing due to the data dependency jitter is suppressed with respect to the non-coded data signal, and an electronic device of satisfactory data transmission quality can be realized.

As described above, the light transmission system according to one or more embodiments of the present invention has a configuration including the first delay unit for delaying the rise start time of the clock signal with respect to the rise start time of the data signal for the binarization signal, where the delay amount of the clock signal by the first delay unit is a time smaller than or equal to a maximum value of the data dependency jitter (DDJ).

The electronic device according to one or more embodiments of the present invention has a configuration including the light transmission system.

Thus, the influence of the fluctuation in timing due to the data dependency jitter is suppressed with respect to the non-coded data signal, and a satisfactory data transmission quality can be realized.

BRIEF DESCRIPTION OF THE DRAWINGS

FIG. 8A is a view showing the general distribution of the fluctuation in timing of the rise of the data signal where the number of bit continuations is between 1 and n, and FIG. 8B is a view showing a distribution of the fluctuation in timing of the rise of the 8b10B coded signal;

FIG. 13A is a cross-sectional view, FIG. 13B is a top view seen from the light transmission module mounting surface, and FIG. 13C is a top view showing the configuration of an electrical wiring layer;

FIG. 18A is a graph showing the temperature characteristics of the signal delay of the light transmission module, and FIG. 18B is a timing chart showing a relationship of the data signal and the clock signal in the light transmission system of a sixth configuration example;

DETAILED DESCRIPTION

Hereinafter, one or more embodiments of the present invention will be described with reference to FIGS. 1 to 21. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, a configuration of a foldable portable telephone including a body unit with an operation key, a lid with a display screen, and a hinge portion for rotatably connecting the lid to the body unit, where the information (data) transmission between the body unit and the lid is performed through a light transmission module arranged in the hinge portion will be described by way of example.

Figure 1A:
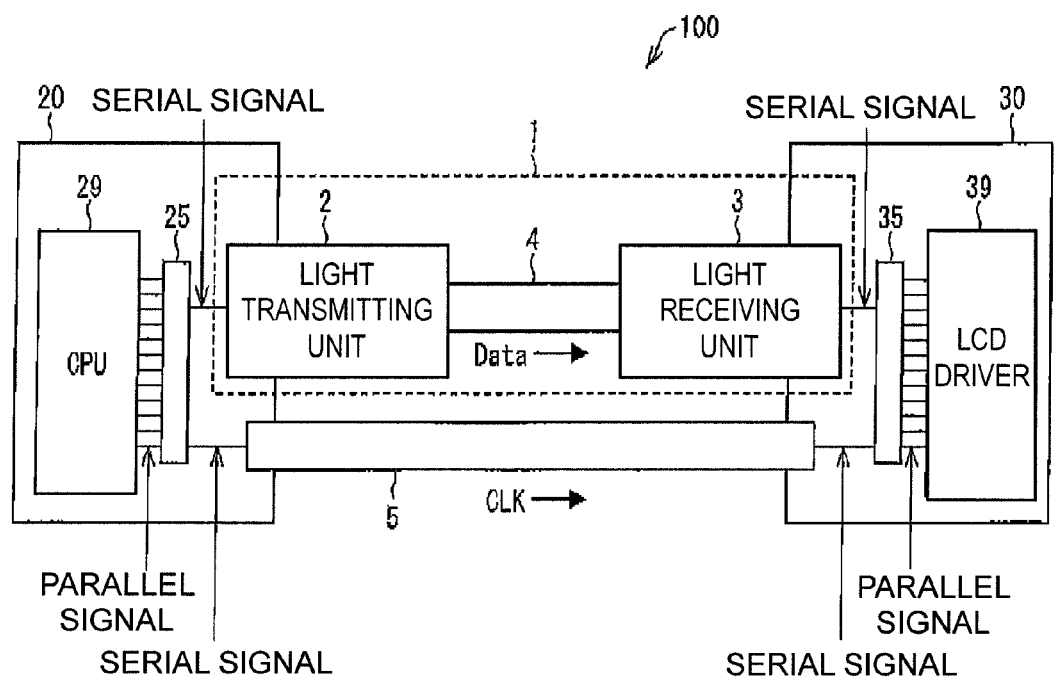
FIG. 1A is a block diagram showing a schematic configuration of a light transmission system arranged in a foldable portable telephone according to one or more embodiments of the present invention.
Figure 1B:
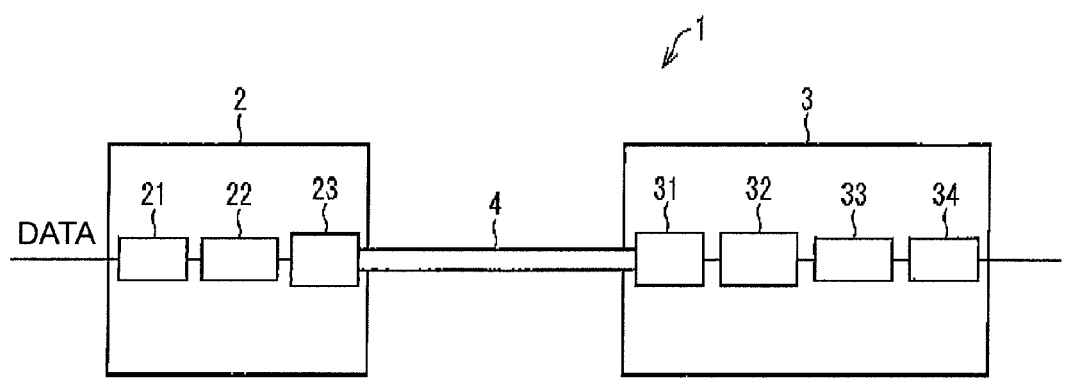
FIG. 1B is a block diagram showing a schematic configuration of the light transmission module in the foldable portable telephone according to one or more embodiments of the present invention.
Figure 2A:
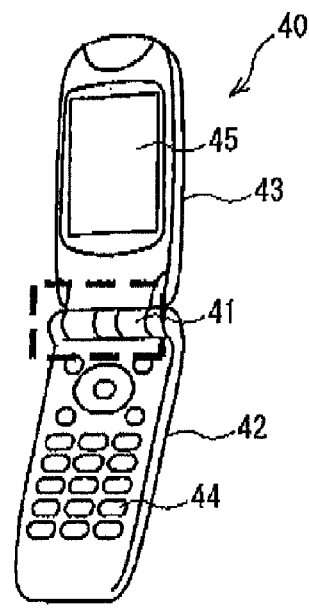
FIG. 2A is a perspective view showing an outer appearance of the foldable portable telephone incorporating the light transmission module according to one or more embodiments of the present invention.

FIGS. 1A and 1B are block diagrams showing a schematic configuration of a light transmission system 100 arranged in a foldable portable telephone 40 according to one or more embodiments of the present invention. FIG. 2A is a perspective view showing an outer appearance of the foldable portable telephone 40 incorporating the light transmission module 1 according to one or more embodiments of the present invention, and FIG. 2B is a perspective plan view of a hinge portion 41 (portion surrounded with a broken line) in FIG. 2A.

Figure 2B:
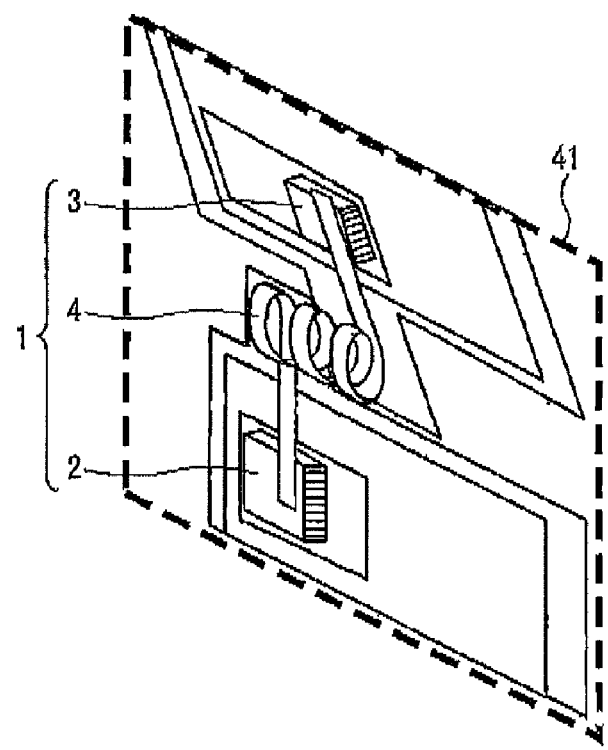
FIG. 2B is a perspective plan view of a hinge portion (portion surrounded with a broken line) in FIG. 2A.

As shown in FIG. 1A and FIGS. 2A and 2B, the foldable portable telephone 40 (hereinafter simply referred to as the "portable telephone 40") according to one or more embodiments of the present invention is configured by a body unit 42, a hinge portion 41 arranged at one end of the body unit 42, and a lid 43 rotatably arranged with the hinge portion 41 as a shaft.

The body unit 42 includes an operation key 44 for operating the portable telephone 40, and interiorly includes a main control board 20. The lid 43 exteriorly includes a display screen 45 and a camera (not shown) and interiorly includes an application circuit board 30. The driver 39 and the like are mounted thereon.

In the portable telephone 40 having the above configuration, the transmission of data signals between the main control board 20 and the application circuit board is performed through the light transmission module 1. The transmission of clock signals is performed through the electrical transmission path 5.

As shown in FIG. 1A, the main control board 20 on the body unit 42 side includes a CPU (signal generation unit) 29 for comprehensively controlling each element (not shown) mounted on the board 20, and a transmission processing unit 25. The CPU 29 outputs a data signal to a light transmitting unit 2 of the light transmission module 1, and transmits the clock signal to the electrical transmission path 5. The transmission processing unit 25 performs transmission process of the signal output from the CPU 29, and includes, for example, a serializer for parallel/serial converting the signal output from the CPU 29.

The application circuit board 30 includes a reception processing unit (reception processing unit) 35, an LCD (Liquid Crystal Display) (not shown) for displaying images based on image data (binarization signal) transferred from the CPU 29, and the LCD driver (control unit) 39 serving as a drive unit for drive controlling the LCD. The reception processing unit 35 receives the data signal and the clock signal output from the light transmission module 1 and the electrical transmission path 5, and outputs the same to the LC driver 39. The reception processing unit 35 includes an IF circuit for receiving the data signal and the clock signal and a deserializer, and serial/parallel-converts the binarization signal output from the IF circuit with the deserializer and performs the reception process. The LCD driver 39 performs an output control on the data signal (binarization signal) transmitted through the light transmission module 1 based on the clock signal (binarization signal) transmitted through the electrical transmission path 5.

The configuration of FIGS. 1A and 1B is a configuration for transmitting the parallel signal from the reception processing unit 35 to the LCD driver 39, but the light transmission system 100 is not limited to such configuration. For instance, the light transmission system 100 may include the reception processing unit 35 and an RGBIF circuit in the LCD driver 39 so that the parallel signal is transmitted from the reception processing unit 35 to the RGBIF circuit. Furthermore, the configuration of FIG. 1 is a configuration for transmitting the parallel signal from the CPU 29 to the transmission processing unit 25, but the light transmission system 100 is not limited to such configuration. For instance, the light transmission system 100 may include the transmission processing unit 25 and an LCDIF circuit in the CPU 29 so that the parallel signal is transmitted from the LCDIF circuit to the transmission processing unit 25.

(Configuration of Light Transmission Module)

The configuration of the light transmission module 1 will now be described with reference to FIG. 1B. FIG. 1B is a block diagram showing a schematic configuration of the light transmission module 1 in the portable telephone 40 according to according to one or more embodiments of the present invention.

As shown in the figure, the light transmission module 1 includes the light transmitting unit 2 connected to the main control board 20 mounted with the CPU 29, the light receiving unit 3 connected to the application circuit board 30 mounted with the application circuit such as the LCD driver 39, and the light transmission path 4 including an optical wiring for connecting the light transmitting unit 2 and the light receiving unit 3.

The light transmission path 4 is a medium for transmitting the optical signal serving as a data signal emitted from a light emitting portion 23 to a light receiving portion 31. The details of the light transmission path 4 will be hereinafter described.

As shown in FIG. 1B, the light transmitting unit 2 has a configuration of including an interface circuit (hereinafter referred to as I/F circuit) 21, a light emission drive portion (optical converter) 22, and the light emitting portion 23.

The I/F circuit 21 is a circuit for externally receiving signals having different frequency levels. The I/F circuit 21 is arranged between the electrical wiring for electrical signals externally input to the light transmission module 1 and the light emission drive portion 22.

The light emission drive portion 22 drives the light emission of the light emitting portion 23 based on the electrical signal externally input to the light transmission module 1 through the I/F circuit 21. The light emission drive portion 22 is configured by a light emission drive IC (Integrated Circuit), and the like.

The light emitting portion 23 emits light based on the drive control by the light emission drive portion 22. The light emitting portion 23 is configured by a light emitting element such as VCSEL (Vertical Cavity-Surface Emitting Laser). The light emitted from the light emitting portion 23 is applied to a light incident side end of the light transmission path 4 as an optical signal.

Thus, the light transmitting unit 2 converts an electrical signal input to the light transmitting unit 2 to an optical signal corresponding to the relevant electrical signal, and outputs the same to the light transmission path 4.

The light receiving unit 3 is configured to include the light receiving portion 31, a detection circuit 32, an amplifier 33, and an I/F circuit 34.

The light receiving portion 31 receives the light serving as the optical signal exit from a light exit side end of the light transmission path 4, and outputs the electrical signal through photoelectric conversion. The light receiving portion 31 outputs the data signal, and can be configured by a light receiving element such as a PD (Photo-Diode). The detection circuit 32 determines whether or not the light receiving portion 31 has received the optical signal.

The amplifier 33 amplifies the electrical signal output from the light receiving portion 31 and/or detection circuit 32 to a desired value, and outputs the same to the outside. The amplifier 33 is configured by an amplification IC, and the like.

The I/F circuit 34 is a circuit for outputting the electrical signal amplified by the amplifier 33 to the outside of the light transmission module 1. The I/F circuit 34 is connected with the electrical wiring for transmitting the electrical signal to the outside, and is arranged between the amplifier 33 and the electrical wiring.

Thus, the light receiving unit 3 receives the optical signal output from the light transmitting unit 2 through the light transmission path 4, converts the optical signal to the electrical signal corresponding to the relevant optical signal, and then amplifies the same to a desired signal value and outputs the same to the outside.

(Configuration of Light Transmission Path)

Figure 3A:
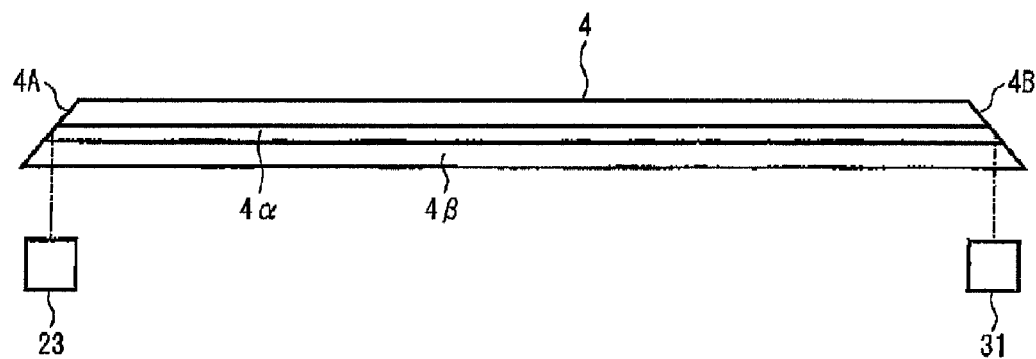
FIG. 3A is a side view of the light transmission path.
Figure 3B:
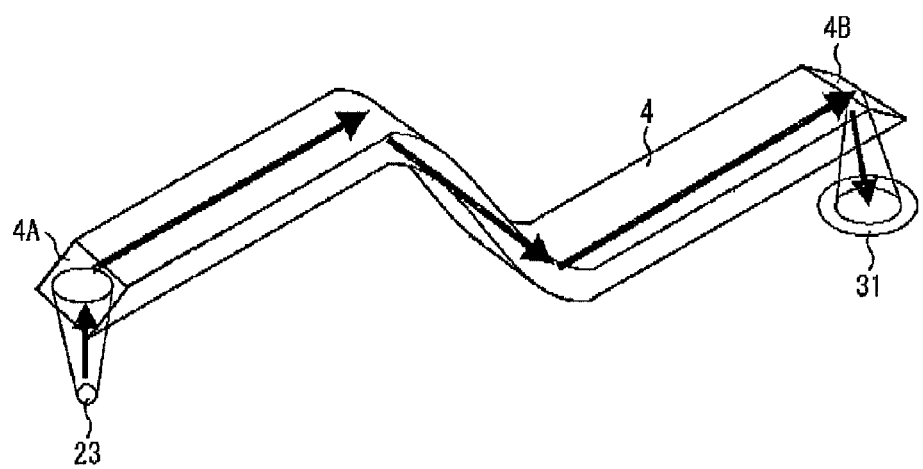
FIG. 3B is a view schematically showing a state of light transmission in the light transmission path.

The details of the light transmission path 4 will now be described using FIGS. 3A and 3B. FIG. 3A shows a side view of the light transmission path 4. As shown in the figure, the light transmission path 4 is configured to include a column-shaped core 4α having the light transmission direction as an axis, and a clad 4β arranged to surround the periphery of the core 4α. The core 4α and the clad 4β are made of material having translucency, where the index of refraction of the core 4α is higher than the index of refraction of the clad 4β. The optical signal entering the core 4α is thus transmitted in the light transmission direction by being totally reflected repeatedly inside the core 4α.

Glass, plastic, or the like may be used for the material for forming the core 4α and the clad 4β, but resin material such as acryl series, epoxy series, urethane series, and silicone series is preferably used to form the light transmission path 4 having sufficient flexibility. The clad 4β may be made of gas such as air. Furthermore, similar effects can be obtained even if the clad 4β is used under an atmosphere of liquid having an index of refraction smaller than the core 4α.

A mechanism of light transmission by the light transmission path 4 will now be described using FIG. 3B. FIG. 3B schematically shows the state of light transmission in the light transmission path 4. As shown in the figure, the light transmission path 4 is made of a column-shaped member having flexibility. A light incident surface 4A is provided on the light incident side end of the light transmission path 4, and a light exit surface 4B is provided on the light exit side end.

The light exit from the light emitting portion 23 enters the light incident side end of the light transmission path 4 from a direction perpendicular to or substantially perpendicular to the light transmission direction of the light transmission path 4. The incident light is introduced into the light transmission path 4 by being reflected at the light incident surface 4A, and advances through the core 4α. The light that advanced through the light transmission path 4 and reached the light exit side end is reflected at the light exit surface 4B, and exit in a direction perpendicular to or substantially perpendicular to the light transmission direction of the light transmission path 4. The light receiving portion 31 is irradiated with the exit light, and photoelectric conversion is performed in the light receiving portion 31.

According to such configuration, the light emitting portion 23 serving as a light source can be arranged in a direction perpendicular to or substantially perpendicular to the light transmission direction in the light transmission path 4. Thus, when the light transmission path 4 needs to be arranged parallel to the substrate surface, the light emitting portion 23 is installed between the light transmission path 4 and the substrate surface so as to emit light in the normal direction of the substrate surface. Such configuration facilitates mounting and realizes a more compact configuration than the configuration of installing the light emitting portion 23 so as to emit light parallel to the substrate surface, for example. This is because the general configuration of the light emitting portion 23 is made such that a size in the direction perpendicular to the direction of emitting light is larger than the size in the direction of emitting light. Furthermore, application can be made to a configuration of using a plane mounting light emitting element in which the electrode and the light emitting portion 23 are in the same plane.

The light transmission path 4 shown in the figure has a configuration in which the light incident surface 4A and the light exit surface 4B are inclined, as described above, but the light transmission path 4 according to one or more embodiments of the present invention may have a configuration in which both end surfaces are orthogonal to the light transmission direction. In other words, the outer shape of the light transmission path 4 may be formed to a solid rectangular shape.

(Configuration of Electrical Transmission Path)

The details of the electrical transmission path 5 will now be described. The electrical transmission path 5 is arranged parallel to the light transmission path 4, and connects the CPU 29 and the LCD driver 39 to transmit the clock signal output from the CPU 29 to the LCD driver 39.

Figure 4:
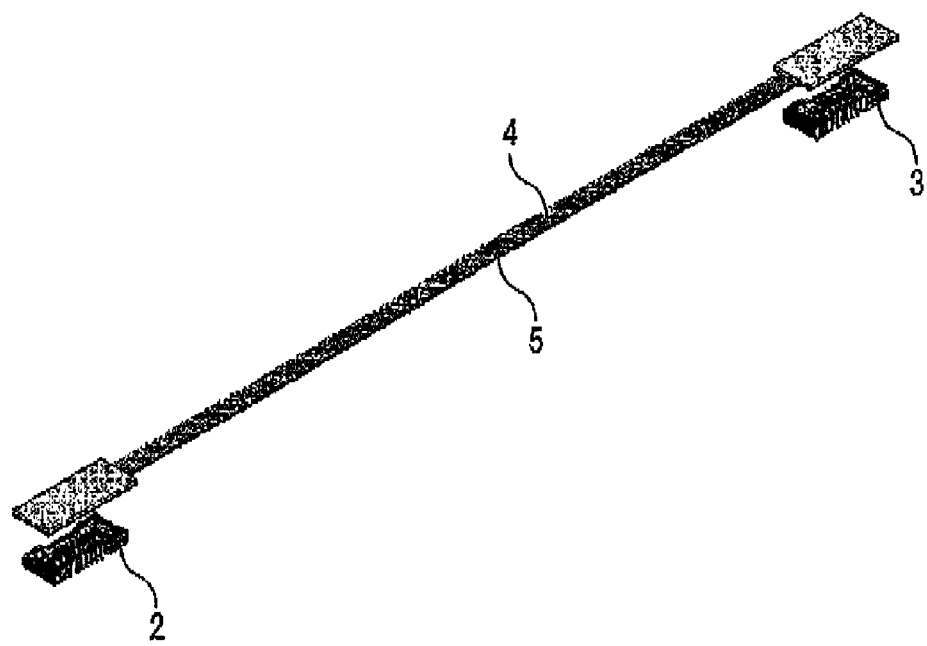
FIG. 4 is a perspective view showing a schematic configuration of the light transmission module when an electrical transmission path is configured by FPC.

The electrical transmission path 5 is specifically configured by a flexible printed circuit board (FPC), coaxial cable, and the like. FIG. 4 is a perspective view showing a schematic configuration of the light transmission module 1 when the electrical transmission path 5 is configured by the FPC. The light transmission module 1 thus can be applied to a small electronic device such as a portable telephone by forming the light transmission path 4 and the electrical transmission path 5 with a flexible wiring.

(Regarding Timing Control of Clock Signal with Respect to Data Signal in Light Transmission Module 1)

In the light transmission system 100, the data signal output from the light transmission module 1 and the clock signal output from the electrical transmission path 5 are both input to the reception processing unit (reception processing unit) 35 (see FIG. 1A). The light transmission system 100 has a characteristic in the output timing control of the clock signal with respect to the data signal input to the reception processing unit 35.

Figure 5A:
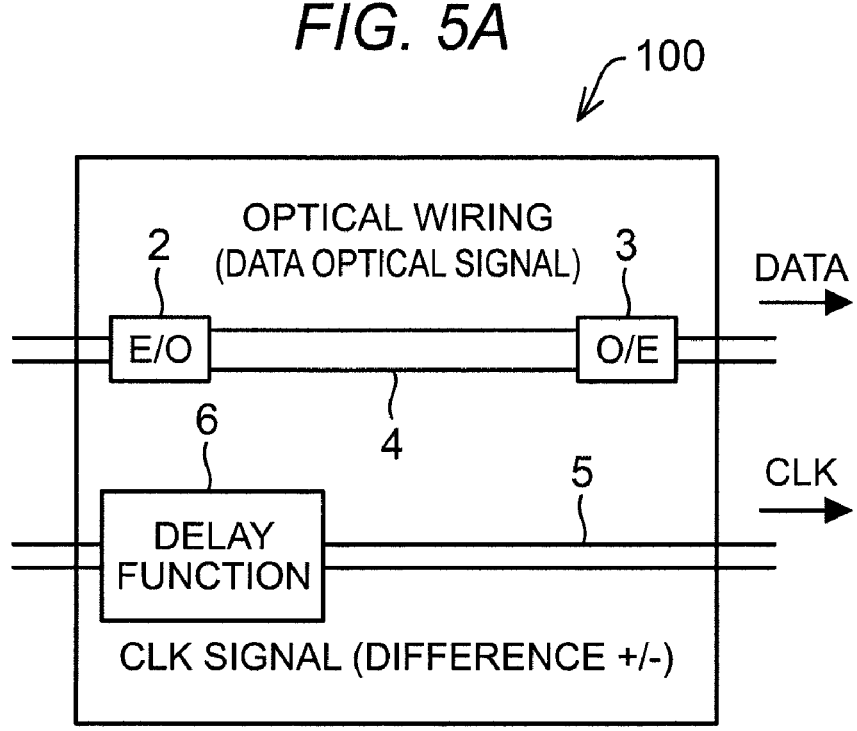
FIG. 5A is a block diagram showing a schematic configuration of the light transmission system including a first delay unit.

In other words, as shown in FIG. 5A, the light transmission system 100 includes a delay unit (first delay unit) 6 for controlling the output timing of the clock signal, and delaying the rise start time (also referred to as rise edge time) of the clock signal with respect to the rise start time of the data signal by a time of smaller than or equal to the data dependency jitter (DDJ).

The "data dependency jitter (DDJ)" is defined as below. It is defined as DDJ=ISI+DCD. DCD is the data dependency, and occurs from a factor (collapse of DC balance (ratio of number of signals with value of "1" and number of signals with value of "0")) different from the ISI.

Specifically, the ISI is the jitter that occurs when the signal with value of "1" is included at the time that is originally a value of "0" due to the bluntness of the signal waveform or the delay of the rise (edge) time. The DCD, on the other hand, refers to the jitter in which the duty ratio (width on time axis of signal with value of "1" or signal with value of "0") of the signal waveform fluctuates. Here, the target of delay by the delay unit 6 is the ISI, and the DCD is not the target.

Figure 5B:
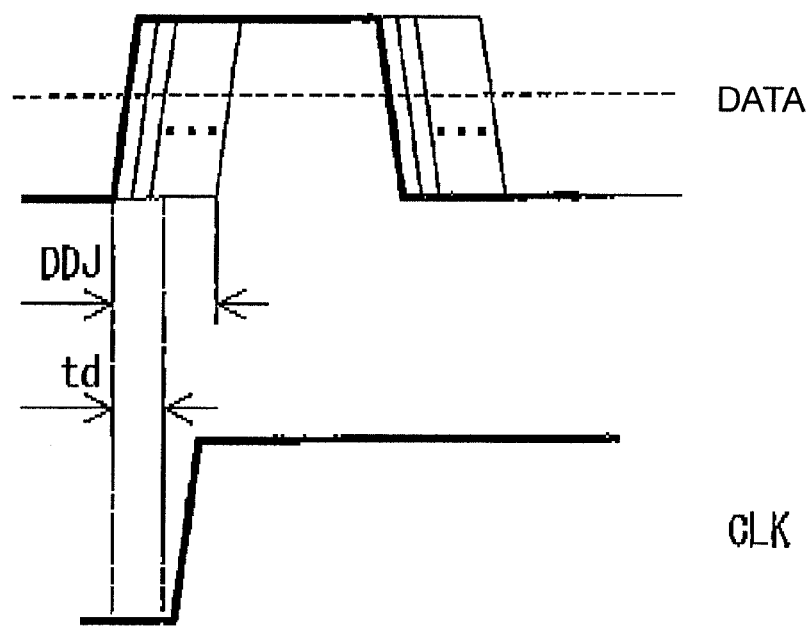
FIG. 5B is a timing chart showing a relationship of a data signal and a clock signal in the light transmission system of FIG. 5A.

FIG. 5B is a timing chart showing a relationship of the data signal and the clock signal in the light transmission system 100 including the delay unit 6. As shown in the figure, the delay amount $t_d$ of the clock signal is smaller than or equal to the data dependency jitter (DDJ) of the data signal. Thus, the influence of fluctuation in timing of the clock signal output due to the data dependency jitter that occurs when the data signal is not coded can be suppressed by adjusting the delay amount $t_d$ of the clock signal. A light transmission system having satisfactory communication quality can be realized as a result.

Figure 6A:
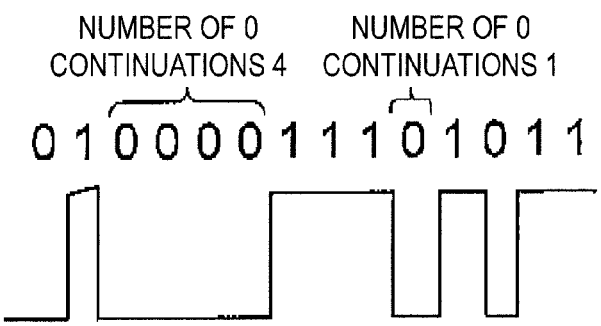
FIG. 6A is a schematic view schematically showing the data signal transmitted through the light transmission module.
Figure 6B:
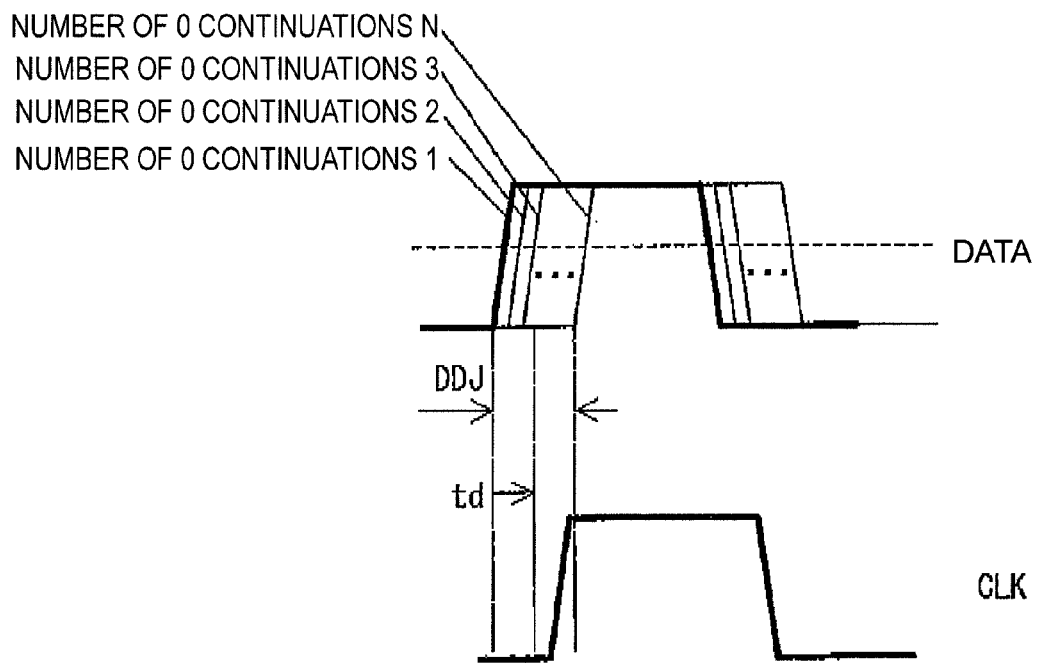
FIG. 6B is a view showing a relationship of the data dependency jitter (DDJ) in the data signal and the delay amount of the clock signal.

The effects will be further described in detail based on FIGS. 6A and 6B. FIG. 6A is a schematic view schematically showing the data signal transmitted through the light transmission module, and FIG. 6B is a view showing a relationship of the data dependency jitter (DDJ) in the data signal and the delay amount $t_d$ of the clock signal. In FIG. 6B, a case where the value of "0" of the data signal is continued will be described. A case where the value of "1" of the data signal is continued is similar to such case, and thus the description thereof will not be given.

As shown in FIG. 6B, the rise start time of the data signal in the reception processing unit 35 tends to become late as the number of continuations of the value of "0" increases from one to N. For instance, when the reception processing unit 35 outputs the data signal in which the value of "0" is continued three times, the rise start time of the output voltage of the third value of "0" is later than the rise start time of the output voltage of the first value of "0". Such delay in the rise start time becomes significant as the number of continuations of the value of "0" in the data signal becomes greater. The data dependency jitter (DDJ) can be expressed as the delay amount of the rise start time of the output voltage of the $N^{th}$ value of "0" with respect to the rise start time of the output voltage of the first value of "0" in the data signal in which the value of "0" is continued for N times at a maximum.

In the light transmission system 100, the DC balance by coding is not performed on the data signal, and the data dependency jitter (DDJ) is significant. The data dependency jitter is caused by the degradation of the light transmission and reception IC band of the light transmitting unit 2 and the light receiving unit 3 in the light transmission module 1. Thus, the data dependency jitter occurs only in the direction the time is delayed (+t direction) and the distribution of the rise start time of the data signal becomes an asymmetrical distribution. When adjusting the delay amount of the clock signal such that the rise start time of the clock signal matches the rise start time of the data signal having the asymmetrical distribution, the adjustment is difficult with the technique using a "delay circuit" as in Japanese Unexamined Patent Publication No. 2007-124130.

When the delay circuit is used, the variation of the signal becomes a symmetrical distribution such as the process variation and the operation condition variation of the delay circuit. Thus, when the data signal is coded, the continuation of the value of "0" is relatively few, and the DC balanced is satisfied, the variation of the signal is reduced by matching the timing of the data signal and the clock signal.

However, if the distribution of the rise start time of the data signal is an asymmetrical distribution, as described above, the variation of the signal becomes asymmetric and cannot be dealt with the adjustment using the delay circuit as in Japanese Unexamined Patent Publication No. 2007-124130.

According to the light transmission system 100, the clock signal is delayed with respect to the data signal in advance, and the delay amount $t_d$ thereof is adjusted to smaller than or equal to the delay amount (DDJ) of the rise start time of N continuations of the value of "0" in the data signal. Since the clock signal is set to be delayed by a constant time with respect to the data signal, the distribution of the rise start time of the data signal due to the data dependency jitter with respect to the rise start time of the clock signal becomes a symmetrical distribution. (Even if the rise start time of the voltage indicating the value of "0" is delayed due to the data dependency jitter, such delay time is either later than or earlier than the rise start time of the clock signal, and the variation of adjustment becomes a symmetrical distribution). As a result, the influence of fluctuation in timing due to the data dependency jitter is suppressed with respect to the non-coded data signal, and a satisfactory data transmission quality can be realized.

In the light transmission system 100, the delay amount $t_d$ of the clock signal by the delay unit 6 merely needs to be a time smaller than or equal to a maximum value of the data dependency jitter of the data signal. The delay amount $t_d$ is preferably ¼ to ⅓ of the maximum value of the data dependency jitter (DDJ). The delay amount $t_d$ is more preferably ½ of the maximum value of the data dependency jitter (DDJ).

Figure 7A:
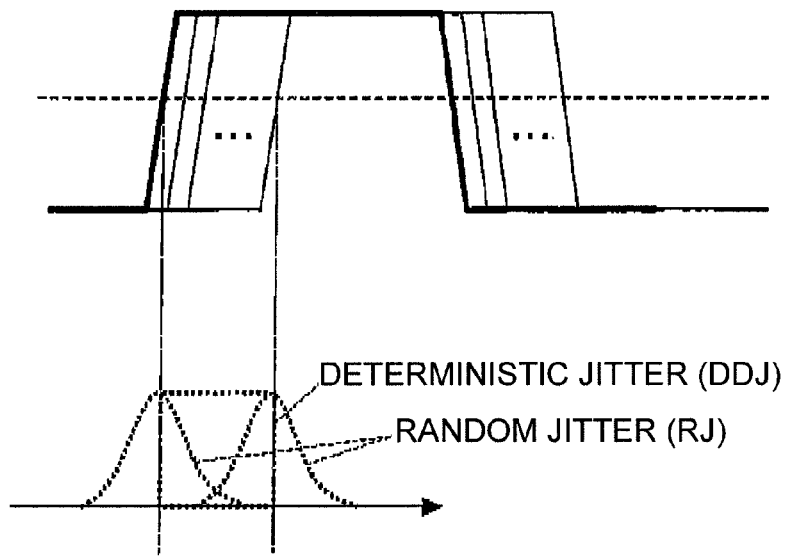
FIG. 7A is a schematic view showing the jitter configuring the timing fluctuation of the data signal.

The relationship between the delay amount $t_d$ of the clock signal by the delay unit 6 and the data dependency jitter (DDJ) will be described below. First, before describing the fluctuation in timing of the rise of the data signal due to the actual influence of the data dependency jitter, the general fluctuation in timing of the rise start time of the data signal will be described. FIG. 7A is a schematic view showing the jitter configuring the timing fluctuation of the data signal, and FIG. 7B is a schematic view showing a distribution of the timing fluctuation of the data signal serving as a sum of jitters shown in FIG. 7A.

As shown in FIG. 7A, the factor of the timing fluctuation of the data signal is the jitter configured by a jitter (deterministic jitter) of deterministic component, and a jitter (random jitter) of random component. The rise fluctuation of the data signal is expressed as a sum of the jitter (deterministic jitter) of deterministic component and the jitter (random jitter) of random component, and has a distribution of "total timing fluctuation" shown in FIG. 7B. Assuming a timing margin is M [ps], the value obtained by integrating the distribution of the "total timing fluctuation" in the range of the timing margin M becomes the proportion of the bits that can be accurately data-transmitted in the light transmission system.

Figure 8A:
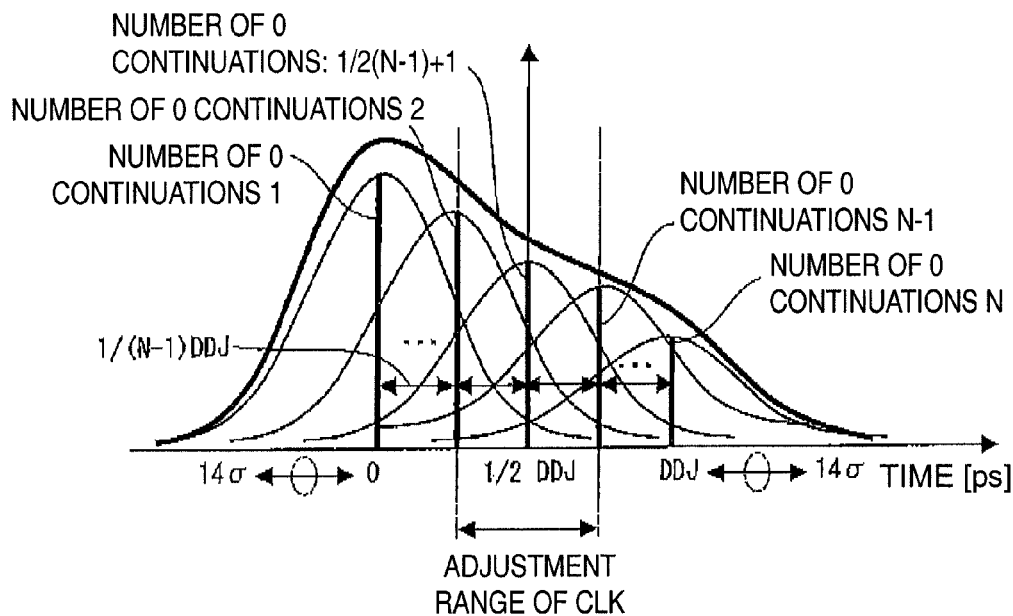
FIGS. 8A and 8B shows a distribution of the fluctuation in timing of the rise of the data signal due to the influence of the data dependency jitter, where
Figure 8B:
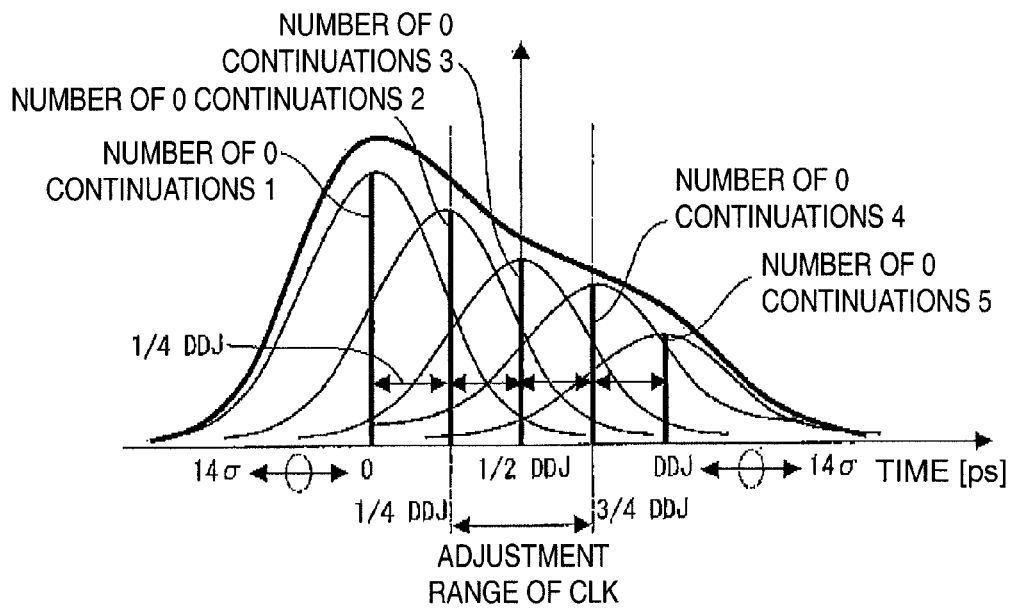

The fluctuation in timing of the rise of the data signal due to the influence of the data dependency jitter will be described with reference to FIGS. 8A and 8B. FIG. 8A is a view showing the distribution of the fluctuation in timing of the rise of the data signal due to the influence of the data dependency jitter.

Figure 7B:
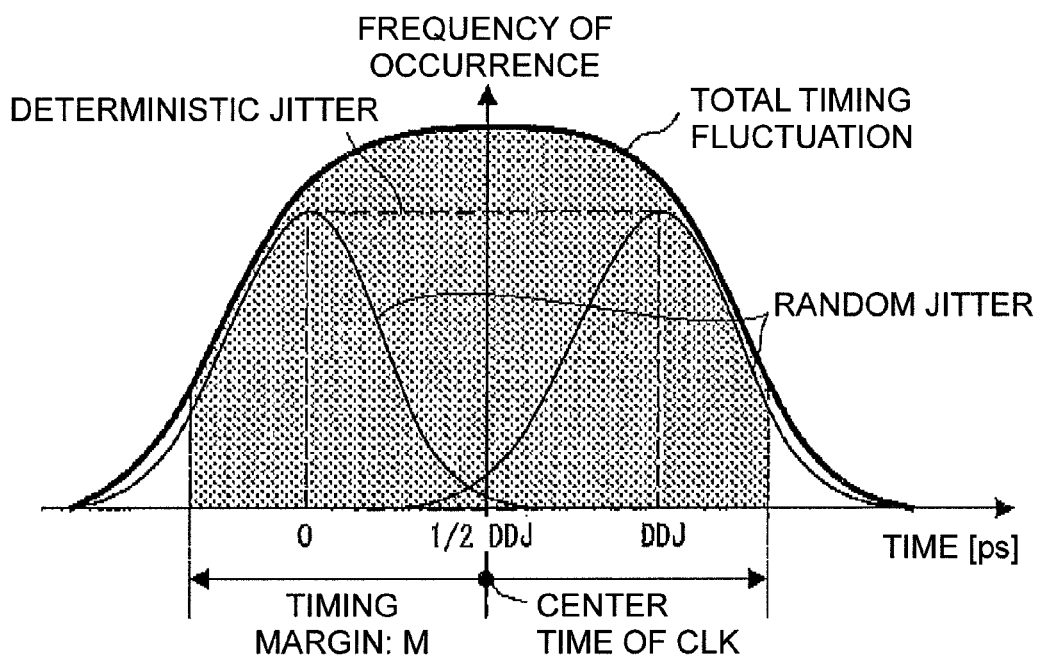
FIG. 7B is a schematic view showing a distribution of the timing fluctuation of the data signal serving as a sum of jitters shown in FIG. 7A.

In FIG. 7B, the jitter (deterministic jitter) of deterministic component is assumed to have a uniform distribution. In reality, however, the jitter (deterministic jitter) of deterministic component is not uniform due to the influence of the data dependency jitter. The jitter of deterministic component has a discrete function corresponding to the number of bit continuations, as shown in FIG. 8A. As shown in the figure, δ function is set for every number of bit continuations (1-n).

The sum of the jitter of deterministic component serving as the discrete function and the jitter of random component serving as Gaussian function is the "total timing fluctuation". The jitter of deterministic component is a distribution that depends on the data and occurs determinably. The jitter of random component having the α function of each number of bit continuations as a peak is added to the jitter of deterministic component. Thus, the range of the maximum value of t<0 and t>DDJ in the "total timing fluctuation" is the Gaussian distribution, where the event probability is equal to each other and is symmetric. When realizing satisfactory transmission characteristic with respect to such distribution, a constant bit error rate (BER: proportion of error bit with respect to the total number of bits) in the delaying direction (+t direction) becomes large in a general method of matching the timing of the clock signal to the time point of t=0 of the jitter of deterministic component. Therefore, in the general method, satisfactory transmission characteristics are difficult to realize.

Therefore, the delay amount of the clock signal by the delay unit 6 of the light transmission system 100 is preferably set between the peak time of the α function in the number of bit continuations 2 and the peak time of the α function in the number of bit continuations N−1. The influence due to the data dependency jitter (DDJ) thus can be suppressed even if the number of bit continuations of the data signal is increased.

For instance, bit continuation occurs even in the 8b10B coding system, and the maximum value of the number of bit continuations is N=5. Such system can be considered similar to the above, and the delay amount of the clock signal by the delay unit 6 can be set. FIG. 8B is a view showing a distribution of the fluctuation in timing of the signal rise due to the influence of the data dependency jitter.

As shown in the figure, the interval between the peaks of the δ function for each number of bit continuations can be approximately assumed as equal interval. Thus, the rise time (peak time of δ function) of the data signal when the number of bit continuations is 2 is ¼ DDJ (¼ of maximum value of DDJ). The rise time (peak time of δ function) of the data signal when the number of bit continuations is 4 is ¾ DDJ (¾ of maximum value of DDJ). Similar to the above, the delay amount of the clock signal by the delay unit 6 is preferably set between ¼ DDJ and ¾ DDJ. Thus, the influence due to the data dependency jitter (DDJ) thus can be suppressed even if the number of bit continuations of the data signal is increased.

When the delay amount of the clock signal by the delay unit 6 is ½ of the data dependency jitter (DDJ), the rise start time of the clock signal is a time either later than or earlier than the rise start time of the clock signal, and the variation of the signal reliably becomes a symmetrical distribution.

In the light transmission system 100, the data dependency jitter occurs due to the loss of the signal amplitude of the data signal in the light receiving unit 3 of the light transmission module 1. Thus, the maximum value (DDJ(max)) of the data dependency jitter is a value determined depending on the frequency characteristics of the light receiving unit 3. The data dependency jitter (DDJ) will be further described in detail below.

Figure 9A:
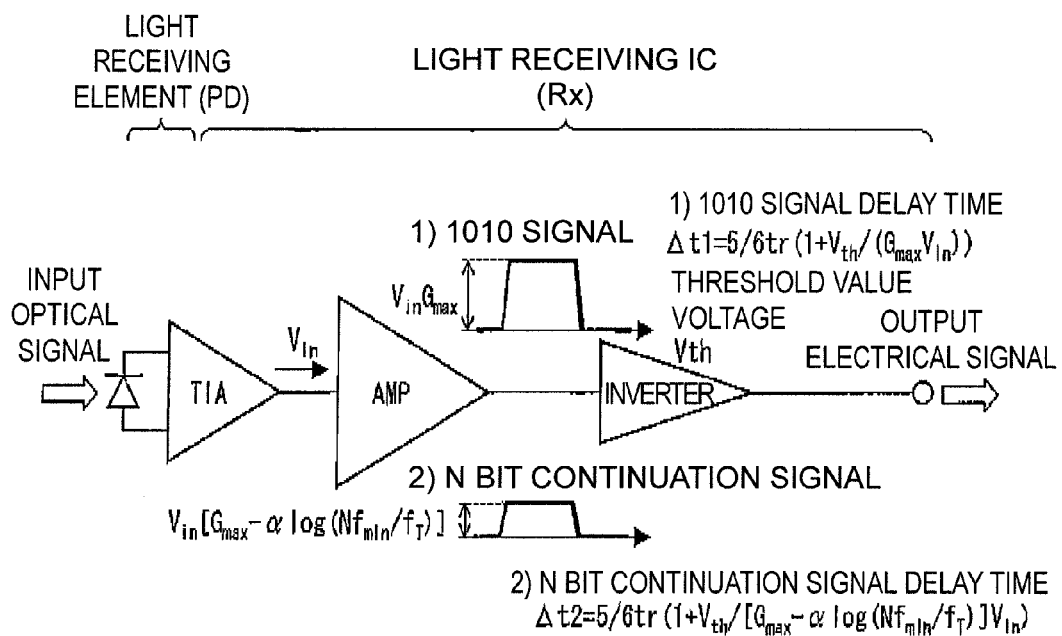
FIG. 9A is an explanatory view describing the relationship between the loss of signal amplitude of the data signal and the data dependency jitter in the light receiving unit.
Figure 9B:
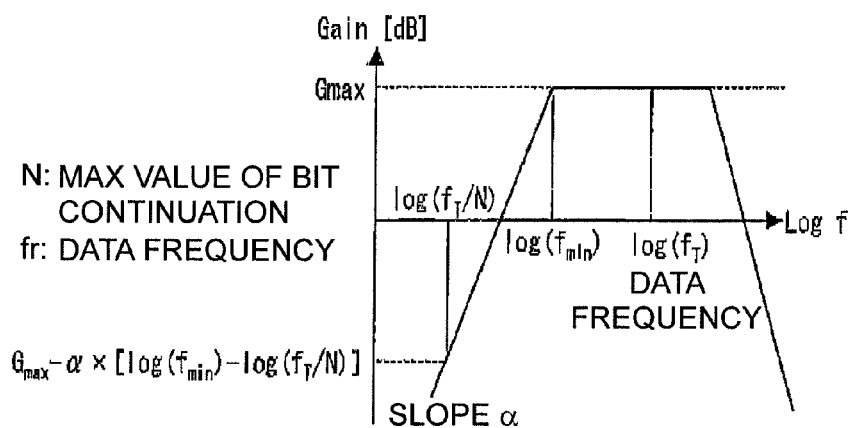
FIG. 9B shows the frequency characteristics of an AMP circuit (amplifier) arranged in the light receiving unit, and is a graph showing the relationship of the frequency and the gain.

FIG. 9A is an explanatory view describing the relationship between the loss of signal amplitude of the data signal and the data dependency jitter in the light receiving unit 3. FIG. 9B shows the frequency characteristics of an AMP circuit (amplifier 33) arranged in the light receiving unit 3, and is a graph showing the relationship of the frequency and the gain.

As shown in FIG. 9A, the light receiving unit 3 includes a light receiving element (PD), a TIA circuit, an AMP circuit, and an inverter circuit (first binarization signal generation unit). In the configuration of the light receiving unit 3 shown in the figure, the light receiving element (PD) corresponds to the light receiving portion 31. The TIA circuit is arranged in the detection circuit 32. The AMP circuit is arranged in the amplifier 33.

The light receiving element (PD) shown in the figure receives the optical signal transmitted by the light transmission path 4 and converts the same to current. The TIA circuit (Trans-Impedance Amplifier circuit) converts the current converted by the light receiving element (PD) to voltage and amplifies the same, and outputs the same as a voltage signal. The voltage signal output from the TIA circuit is amplified by the AMP circuit, and digitized by the inverter circuit.

The light receiving unit 3 normally operates at a frequency of greater than or equal to $f_{min}$. The fundamental frequency of the signal input to the light receiving IC is $f_T$. In this case, the lowest frequency of the pulse contained in the transmission signal is $f_T/N$ in the system where the signal in which the same value continues for N bits at a maximum is input to the AMP circuit. Generally, the frequency characteristics of the AMP circuit are as shown in the graph of FIG. 9B, and are not amplified with respect to the input signal of low frequency. A difference creates in the amplitude of the signal input to the inverter circuit (CMOS switch) in the light receiving IC due to such frequency characteristics. As a result, delay occurs in the time the inverter circuit is turned ON, and such delay becomes the data dependency jitter (DDJ).

Specifically, from the frequency characteristics of the AMP circuit shown in FIG. 9B, the gain takes a maximum value $G_{max}$ if the operating frequency is greater than or equal to the transmittable rate $f_{min}$. The fundamental frequency $f_T$ is set to be greater than the transmittable rate $f_{min}$ so that a maximum gain $G_{max}$ is obtained. The gain in a case where a signal in which the same value continues for N bits (hereinafter referred to as N bit continuation signal) at a maximum is input to the AMP circuit will be described.

As shown in FIG. 9B, when the N bit continuation signal is input to the AMP circuit, the signal transmission rate thereof is lower than the transmittable rate $f_{min}$ and is $f_T/N$. Thus, the gain $G_2$ is a value lower than $G_{max}$, and is expressed with the following equation (a).

$$G_2 = G_{max} - \alpha \times [\log(f_{min}) - \log(f_T/N)] \quad (a)$$

In equation (a), $\alpha$ represents the increasing rate of the gain with respect to the frequency of the AMP circuit.

The signal delay time when the AMP circuit 1) outputs a signal of "1010" and when the AMP circuit 2) outputs N bit continuation signal, with ½ of the amplitude of the voltage signal input to the AMP circuit as Vin, will be described.

When 1) outputting the signal of "1010", the signal amplitude $V_1$ output from the AMP circuit is expressed with the following equation (b).

$$V_1 = V_{in} G_{max} \quad (b)$$

With the threshold value voltage when the signal output from the AMP circuit is digitized by the inverter circuit as $V_{th}$, the signal delay time $\Delta t1$ of the signal of "1010" is expressed with the following equation (c).

$$\Delta t1 = \frac{5}{6} tr \left(1 + \frac{V_{th}}{G_{max} V_{in}}\right) \quad (c)$$

In equation (c), tr represents the rise time required for the signal to rise from 20% to 80% of the signal amplitude.

When 2) outputting the N bit continuation signal, the signal amplitude $V_2$ output from the AMP circuit is expressed with the following equation (d).

$$V_2 = V_{in}[G_{max} - \alpha \log(Nf_{min}/f_T)] \quad (d)$$

The signal delay time $\Delta t2$ of the N bit continuation signal is expressed with the following equation (e).

$$\Delta t2 = \frac{5}{6} tr \left(1 + \frac{V_{th}}{[\{G_{max} - \alpha \log(Nf_{min}/f_T)\} V_{in}]}\right) \quad (e)$$

The data dependency jitter DDJ(max) by the input of the N bit continuation signal is the difference between $\Delta t2$ and $\Delta t1$, that is, $\Delta t2 - \Delta t1$. Therefore, the data dependency jitter DDJ (max) can be expressed with the following equation (I).

$$DDJ(\max) = \frac{5}{6} \times tr \times \frac{V_{th}}{V_{in}} \times \frac{1}{G_{max}\left\{\frac{G_{max}}{\alpha \log(Nf_{min}/f_T)} - 1\right\}} \quad (I)$$

In equation (I), parameters such as $\alpha$, tr, $G_{max}$, $V_{th}$, $V_{in}$, $f_{min}$, and $f_T$ are appropriately set by various circuits configuring the light receiving unit 3. The data dependency jitter DDJ(max) can be calculated by each parameter set in such manner based on equation (I).

The maximum value N of the number of bit continuations of the data signal can be appropriately determined according to the light transmission system to be applied. Since the maximum value of the number of bit continuations is determined in such manner, the data dependency jitter that occurs in the data signal can also be determined.

Figure 10A:
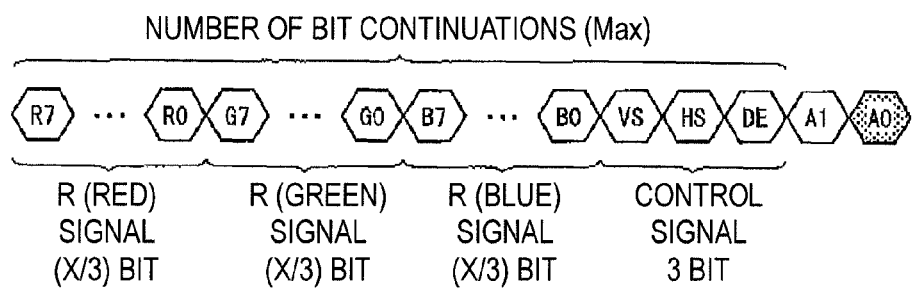
FIG. 10A is an explanatory view describing the number of bit continuations in an RGB signal serving as the data signal.
Figure 10B:
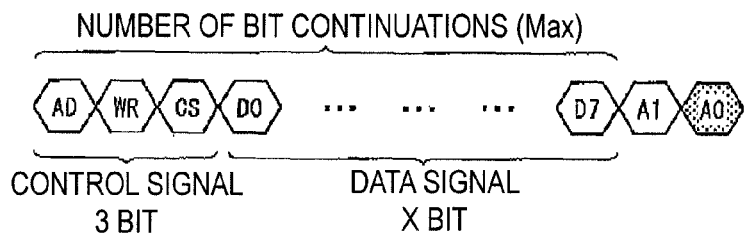
FIG. 10B is an explanatory view describing the number of bit continuations in a CPU signal serving as the data signal.

FIG. 10A is an explanatory view describing the number of bit continuations in an RGB signal serving as the data signal. FIG. 10B is an explanatory view describing the number of bit continuations in a CPU signal serving as the data signal.

As shown in FIG. 10A, the RGB signal includes a R (red) signal, a G (green) signal, a B (blue) signal, and a control signal. The number of bits of the R (red) signal, the G (green) signal, and the B (blue) signal each depends on the number of tones X. Thus, when the light transmission system 100 transmits the RGB signal as the data signal, the maximum value N of the number of bit continuations is determined according to the number of tones X of the color to be displayed.

For instance, if the number of tones of the color to be displayed is X=18 (18 tone display; 182.6 thousand colors), the maximum value N of the number of bit continuations is 21 bits (=18 bits (RGB)+3 bits (control)). If the number of tones is X=24 (24 tone display; 241.677 thousand colors), the maximum value N of the number of bit continuations is 27 bits (=24 bits (RGB)+3 bits (control)). Furthermore, if the number of tones is X=16 (16 tone display; R:60, G:50, B:65 thousand colors), the maximum value N of the number of bit continuations is 19 bits (=19 bits (RGB)+3 bits (control)).

When the light transmission system 100 transmits the CPU signal as the data signal, the maximum value N of the number of bit continuations is determined according to the number of data bits X'. As shown in FIG. 10B, the CPU signal includes the control signal and the CPU data signal. The number of bits of the CPU signal depends on the number of data bits X' of the CPU data signal.

For instance, if the CPU signal is CPU data of 8 bits, the maximum value N of the number of bit continuations is 11 bits (=8 bits (CPU data)+3 bits (control)). If the CPU signal is CPU data of 16 bits, the maximum value N of the number of bit continuations is 19 bits (=16 bits (CPU data)+3 bits (control)). If the CPU signal is CPU data of 32 bits, the maximum value N of the number of bit continuations is 35 bits (=32 bits (CPU data)+3 bits (control)).

(Regarding Delay Unit 6)

As described above, the delay unit 6 has a delay function for delaying the output of the clock signal with respect to the data signal by a time of smaller than or equal to the data dependency jitter (DDJ) in the light transmission system 100. The influence of the fluctuation in timing of the clock signal output due to the data dependency jitter that occurs when the data signal is not coded can be suppressed by adjusting the delay amount $t_d$ of the clock signal. One example of the delay unit 6, which is a characteristic of the light transmission system 100, will be described below.

The delay unit 6 may be means for providing the delay function by setting an electrical wiring length of the electrical transmission path 5, or means for providing the delay function by adjusting the clock signal waveform input to the reception processing unit 35.

(Electrical Transmission Path 5 Serving as Delay Unit 6)

When adjusting the delay amount of the clock signal with respect to the data signal to the time of smaller than or equal to the data dependency jitter (DDJ), adjustment at a few 100 ps (pico second) order is required. The conventional delay element (e.g., compensation element) cannot be used for the delay unit 6 of the light transmission system 100 since the delay amount (delay time) of the clock signal is discrete. Furthermore, using the IC for the delay element is unsuitable for adjustment of the delay amount of the clock signal by the delay unit 6 due to influence of process variation, temperature variation, power supply variation, and the like.

The background for why the delay element used in the conventional light transmission system cannot be applied to the delay unit 6 includes the following. The signal delay amount between the signal transmitted through the optical wiring and the signal transmitted through the electrical wiring is originally very large and is a few ns (nano second). The adjustment of the delay amount of the clock signal, which is the target of the conventional delay element, is the adjustment at a few ns (nano second). Therefore, the mounting of such delay element leads to increase in size of the electronic device and increase in power consumption, whereby such delay element is unrealistic for application to wiring in the electronic device such as the foldable portable telephone.

When adjusting the delay amount of the clock signal with respect to the data signal at a few 100 ps (pico second) order as in the delay unit 6, it is effective to set the electrical wiring length of the electrical transmission path 5.

Figure 11:
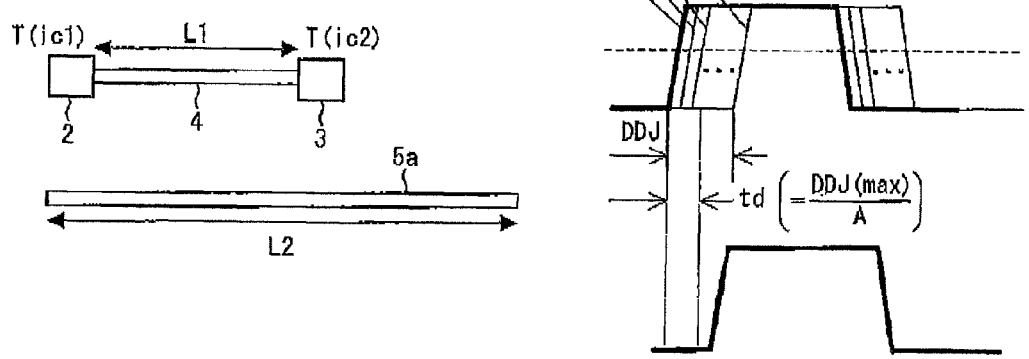
FIG. 11 is an explanatory view describing a relationship of a wiring length of the electrical transmission path and a wiring length of the light transmission path when the electrical transmission path is used for the delay unit.

FIG. 11 is an explanatory view describing a relationship of a wiring length of the electrical transmission path 5 and a wiring length of the light transmission path 4 when the electrical transmission path 5 is used for the delay unit 6.

Assuming the data dependency jitter of N bit continuation signal is DDJ(max), the signal delay time in the light transmitting unit 2 is T(ic1), the signal delay time in the light receiving unit 3 is T(ic2), the wiring length of the light transmission path 4 is $L_1$, and the wiring length of the electrical transmission path 5 is $L_2$, the following equation (1) is satisfied.

$$T(ic1) + T(ic2) + \frac{nL_1}{c} + \frac{DDJ(\max)}{A} = \frac{L_2\sqrt{\varepsilon r}}{c} \quad (1)$$

Here, n is the index of refraction of the core of the light transmission path 4, c is the speed of light, and εr is the relative permittivity.

Furthermore, DDJ(max)/A in equation (1) indicates the delay amount of the clock signal with respect to the rise start time of the data signal. Taking the above description into consideration, A in equation (1) can be set as long as it is a numerical value greater than one, and preferably greater than or equal to 3/2, and more preferably 2.

The output of the clock signal can be delayed with respect to the data signal by a time smaller than or equal to the data dependency jitter (DDJ) by setting the wiring length $L_2$ of the electrical transmission path 5 so as to satisfy equation (1).

Based on equation (1), the parameters necessary for delaying the output of the clock signal by the time smaller than or equal to the data dependency jitter (DDJ) are only the wiring length $L_2$ of the electrical transmission path 5, and the relative permittivity εr of the material configuring the electrical transmission path 5. Thus, the adjustment with small signal variation can be performed compared to a case where adjusting the delay amount of the clock signal using the conventional delay element and the IC. In particular, when adjusting the delay amount of the clock signal to ½ of the data dependency jitter (DDJ), high accuracy is demanded, thus the adjustment of the delay amount by the wiring length/relative permittivity of the electrical transmission path 5 is effective.

When using the electrical transmission path 5 for the delay unit 6, a configuration in which the electrical transmission path 5 is integrated on the FPC (Flexible Printed Circuit board) is preferably adopted. According to such configuration, the variation of the signal can be suppressed, and the space can be saved and the flexible wiring can be realized for the electrical transmission path 5.

The configuration of the electrical transmission path 5 serving as the delay unit 6 will be described below.

First Configuration Example

Figure 12:
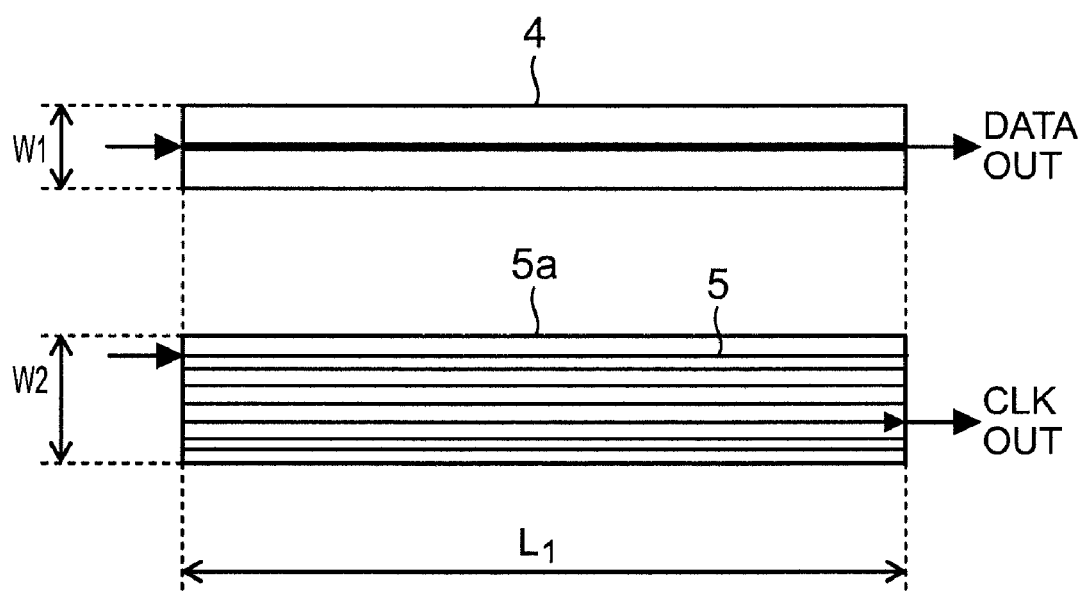
FIG. 12 is a cross-sectional view showing a configuration of the electrical transmission path according to a first configuration example.

FIG. 12 is a cross-sectional view showing a configuration of the electrical transmission path 5 according to a first configuration example. As shown in the figure, the electrical transmission path 5 is integrated on an integrated substrate 5a. The wiring length $L_1$ in the transmission direction in the integrated substrate 5a is the same as the wiring length of the light transmission path 4. Thus, when the dimension in the transmission direction of the integrated substrate 5a and the light transmission path 4 are the same, the influence of the fluctuation in timing of the clock signal output due to the data dependency jitter can be suppressed without influencing the outer shape and the width of the electrical transmission path 5. The space of the electrical transmission path 5 thus can be saved.

As shown in the figure, the integrated substrate 5a is a flexible printed circuit board (FPC), and the electrical transmission path 5 is formed thereon as a wiring pattern. The wiring length of the electrical transmission path 5 can be easily adjusted by forming the wiring pattern of the electrical transmission path 5 on the integrated substrate 5a. The electrical transmission path 5 is pattern-formed so as to reciprocate at least once at one end in the signal transmission direction of the integrated substrate 5a. The delay amount of the clock signal can be adjusted with the number of reciprocations by pattern-forming the electrical transmission path 5. For instance, the delay amount of the clock signal can be accurately adjusted by patterning so that the length of each reciprocation differs.

The wiring pattern (electrical transmission path 5) formed on the integrated substrate 5a is about L(μm)/S(μm)=50/50, and the width of the wiring is preferably a total of 100 μm. If the length of the wiring is 100 mm, the delay amount of the clock signal becomes between 500 ps to 5000 ps by forming the wiring pattern so that the number of reciprocations is between two times and four times.

Miniaturization of the wiring pattern of the electrical transmission path 5 is realized by having the integrated substrate 5*a* as a flexible printed circuit board (FPC). The delay amount of the clock signal thus can be adjusted without increasing the width of the integrated substrate 5*a*. As the parameters for adjusting the delay amount of the clock signal are also few, it is also suitable for the delay unit 6.

The integrated substrate 5*a* formed with the electrical transmission path 5 and the light transmission path 4 may be integrally formed or may be formed as separate bodies.

In particular, with an integrated module in which the integrated substrate 5*a* and the light transmission path 4 are integrally formed, the delay amount of the clock signal can be adjusted with a closed system as the module. Thus, even if the length of the wiring (electrical transmission path 5) is changed according to application, the delay amount of the clock signal can be adjusted without changing the circuit configuration and the delay element in the module. Such adjustment is difficult in a configuration where the circuit is externally attached as in the prior art.

According to the first configuration example, the signal transmission quality can be satisfactorily maintained without increasing the size and the cost of the light transmission module 1, and without affecting the degree of freedom of deformation. Furthermore, the wiring length of the wiring pattern can be fine tuned, and high accuracy delay amount adjustment can be realized.

The integrated substrate 5*a* may be a multilayer FPC in which the flexible printed circuit board (FPC) is stacked in plurals. The integrated substrate 5*a* may be a flexible printed circuit board (FPC) applied with a shield or a double-sided flexible printed circuit board (FPC).

The electrical transmission path 5 may have the R (resistance) and the C (capacitance) serving as wiring parameters of the electrical transmission path adjusted to optimum values for the delay amount adjustment of the clock signal by the width and the shield structure of the flexible printed circuit board (FPC).

Second Configuration Example

Figure 13A:
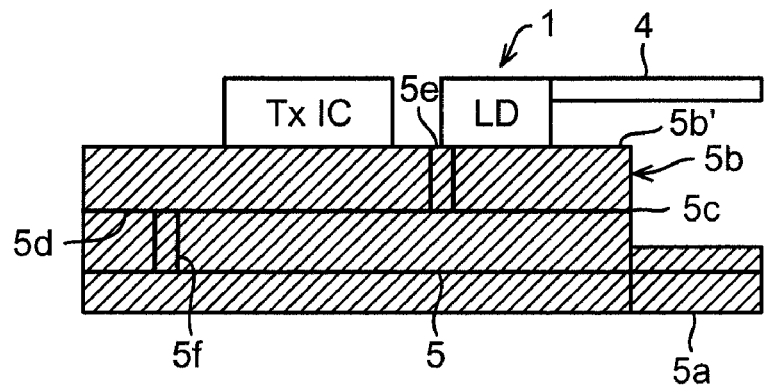
FIGS. 13A to 13C show the configuration of the electrical transmission path serving as a second configuration example, where
Figure 13B:
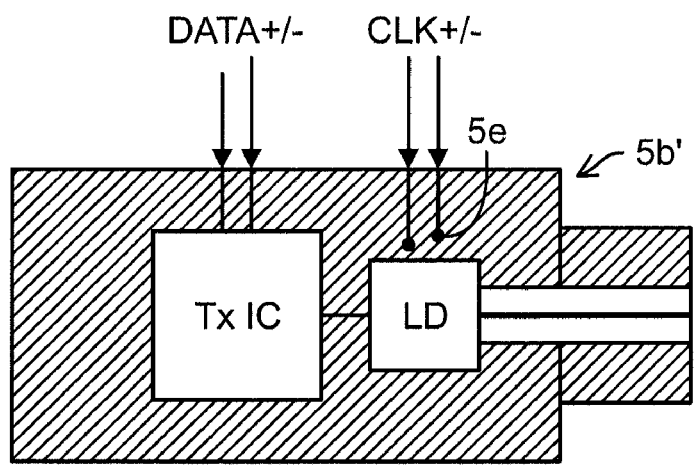
Figure 13C:
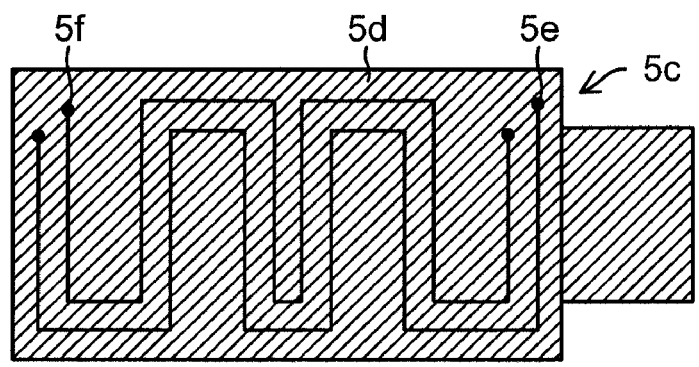

FIGS. 13A to 13C show the configuration of the electrical transmission path 5 serving as a second configuration example, where FIG. 13A is a cross-sectional view, FIG. 13B is a top view seen from the light transmission module mounting surface, and FIG. 13C is a top view showing the configuration of an electrical wiring layer.

As shown in FIGS. 13A to 13C, the integrated substrate 5*a* includes a projection 5*b* that projects out in the signal transmission direction than the light transmission path 4 and that is mounted with the light transmission module 1. The projection 5*b* includes an electrical wiring layer 5*c* in which the electrical wiring 5*d* is pattern-formed. A through-hole 5*e* for inputting the clock signal is formed in the mounting surface 5*b*' of the light transmission module 1 at the projection 5*b*. The through-hole 5*e* is connected with the electrical wiring 5*d*. (see FIGS. 13A and 13C). Furthermore, the electrical wiring layer 5*c* is formed with a through-hole 5*f*. The through-hole 5*f* is connected with the electrical transmission path 5.

Thus, the delay amount of the clock signal can be adjusted by separately arranging the projection 5*b* on the integrated substrate 5*a*, and forming the electrical wiring layer 5*c* in the projection 5*b*. The wiring length of the electrical transmission path 5 can be made substantially long without changing the outer shape of the integrated substrate 5*a* by having the pattern of the electrical wiring 5*d* as the pattern repeatedly turned back at an interval of about 100 μm in the plane of the electrical wiring layer 5*c*.

Furthermore, the delay amount of the clock signal can be adjusted without influencing the outer shape of the connector and the space can be saved by having the projection 5*b* as the connecting portion of the connector for connecting with the outside.

Third Configuration Example

Figure 14:
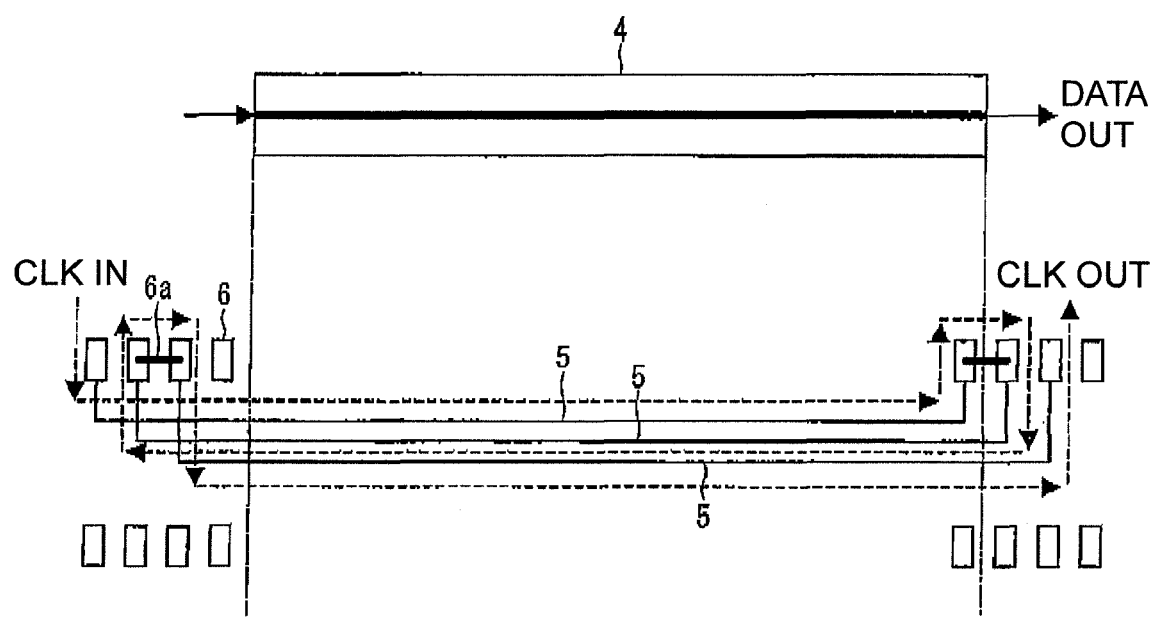
FIG. 14 is a top view showing a configuration of the electrical transmission path serving as a third configuration example.

FIG. 14 is a top view showing a configuration of the electrical transmission path 5 serving as a third configuration example. As shown in the figure, in the third configuration example, a connector terminal 7 formed at the connector portion and the electrical transmission path 5 are connected.

The connector terminal 7 is a terminal for connecting the outside with the light transmission module 1 and the electrical transmission path 5. The clock signal is input to the connector terminal 7. The electrical transmission path 5 is coaxially lined in plurals, and each electrical transmission path 5 is connected with the connector terminal 7.

A connector short-circuit portion 7*a* for short circuiting the connector terminals 7 is arranged at the connector portion. The connector short-circuit portion 7*a* is arranged so that the clock signal is transmitted in a reciprocating manner at the input side and the output side of the electrical transmission path 5.

According to such configuration, the wiring length of the electrical transmission path 5 can be made substantially long without changing the outer shape of the integrated substrate 5*a*. Since the connector short-circuit portion 7*a* is arranged between the connector terminals 7, the impedance of the electrical transmission path 5 is stable. Thus, the waveform control of the clock signal is facilitated.

Fourth Configuration Example

Figure 15:
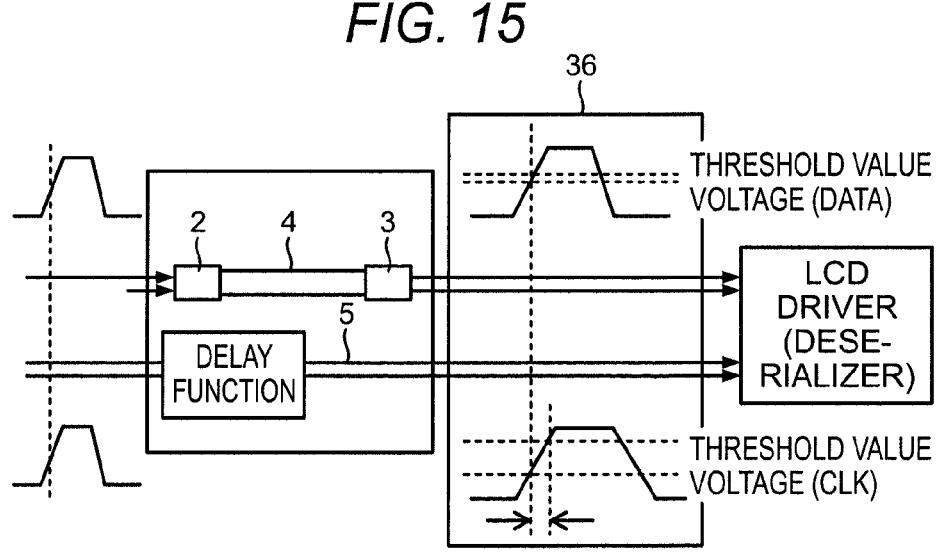
FIG. 15 is a view showing a configuration of the light transmission system serving as a fourth configuration example.

FIG. 15 is a view showing a configuration of the light transmission system 100 serving as a fourth configuration example.

As shown in the figure, the light transmission system 100 includes, as the delay unit 6, a binarization signal generation unit 36 (second binarization signal generation unit) for comparing the level of the input signal and the level of the threshold value and generating a binarization signal having a signal of high level and a signal of low level for each of the data signal and the clock signal based on the comparison result.

As shown in the figure, the level of the threshold value voltage (CLK) (second threshold value) with respect to the clock signal is set higher than the level of the threshold value voltage (Data) (first threshold value) with respect to the data signal in the binarization signal generation unit 36.

In the binarization signal generation unit 36, the voltage higher than the threshold value voltage is recognized as "HIGH" for the input signal. The voltage lower than the threshold value voltage is recognized as "LOW". Therefore, when the level of the threshold value voltage (CLK) with respect to the clock signal is higher than the level of the threshold value voltage (Data) with respect to the data signal, the clock signal output from the binarization signal generation unit 35*a* is delayed with respect to the data signal.

The influence of fluctuation in timing of the clock signal output due to the data dependency jitter can be suppressed by setting the threshold value voltage (CLK) and the threshold value voltage (Data) so that the delay amount of the clock signal becomes a time smaller than or equal to the maximum value of the data dependency jitter (DDJ).

Specifically, with the rise time and the amplitude in the data signal and the clock signal as tr and $V_{od}$, the difference between the threshold value voltage (CLK) and the threshold value voltage (Data) as $\Delta V_{th}$, and the delay amount of the clock signal as $t_d$, the delay amount $t_d$ satisfies the following equation (2) and is a time smaller than or equal to the maximum value of the data dependency jitter (DDJ).

$$t_d = \frac{5}{6} \times tr \times \frac{\Delta V_{th}}{V_{od}} \quad (2)$$

Fifth Configuration Example

Figure 16:
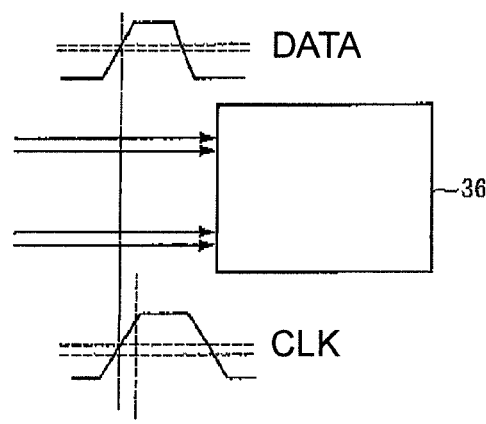
FIG. 16 is a view showing a signal input to a binarization signal generation unit in a fifth configuration example.
Figure 17:
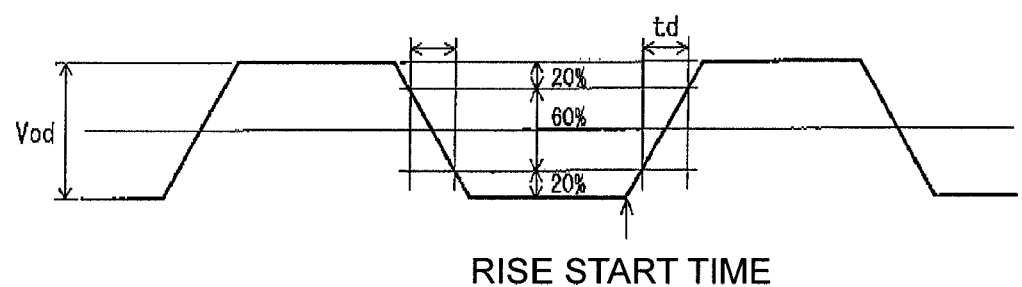
FIG. 17 is a graph for describing "rise time of signal"

The delay unit 6 may adjust the waveform of the signal input to the binarization signal generation unit 36. FIG. 16 is a view showing a signal input to the binarization signal generation unit 36. As shown in the figure, the delay unit 6 performs a process of making the rise time of the clock signal longer than the rise time of the data signal with respect to the signal input to the binarization signal generation unit 36. Here, "rise time of signal" generally refers to a time required to transition from the signal voltage value a to the signal voltage value b. Normally, the "rise time of signal" is defined by tr shown in FIG. 17. In other words, the rise time tr of the signal is defined as a difference between the time reaching 20% of the signal amplitude $V_{od}$ and the time reaching 80% of the signal amplitude $V_{od}$.

According to the above configuration, the rise time of the clock signal is longer than the rise time of the data signal. That is, the data signal rises early compared to the clock signal. Therefore, the clock signal input to the binarization signal generation unit 36 has a blunt waveform compared to the data signal. With respect to the signal output from the binarization signal generation unit 36, the clock signal is delayed with respect to the data signal.

The delay unit 6 performs a process of adjusting the rise time of the data signal and the clock signal so that the delay amount of the clock signal becomes a time smaller than or equal to the maximum value of the data dependency jitter (DDJ). Thus, the influence of fluctuation in timing of the clock signal output due to the data dependency jitter can be suppressed. Furthermore, reduction of the data dependency jitter and the compensation of the delay can be simultaneously realized. If the data signal is raised early compared to the clock signal, as described above, the slew rate becomes larger by such amount and the jitter becomes small.

Specifically, the delay unit 6 performs a process of having the delay amount $t_d$ satisfy the following equation (3) and become a time smaller than or equal to the maximum value of the data dependency jitter (DDJ) with the difference between the rise time of the data signal and the rise time of the clock signal as $\Delta tr$, the amplitude of the data signal and the clock signal as $V_{od}$, the threshold value as $V_{th}$, and the delay amount as $t_d$.

$$t_d = \frac{5}{6} \times \Delta tr \times \left(1 + \frac{V_{th}}{V_{od}}\right) \quad (3)$$

Therefore, the influence of the fluctuation in timing of the clock signal output due to the data dependency jitter can be suppressed by adjusting the delay amount of the clock signal.

The adjustment of the rise time by the delay unit 6 can be realized by adjusting the R (resistance) and the C (capacitance) of the electrical transmission path 5. The delay unit 6 can also adjust the rise time for the data signal and the clock signal output from the light transmitting unit 2 and the light receiving unit 3 of the light transmission module 1. Furthermore, the delay unit 6 can adjust the rise time for the signal output from the serializer serving as the transmission processing unit 25.

The delay unit 6 can adjust the amplitude of the clock signal and the data signal so that the amplitude of the clock signal is smaller to obtain a larger delay amount of the clock signal.

The delay unit 6 may perform the process of having the level of the threshold value voltage (CLK) with respect to the clock signal higher than the level of the threshold value voltage (Data) with respect to the data signal in combination with the fourth configuration example so that the delay amount of the clock signal becomes larger. In this case, the wiring length of the electrical transmission path 5 can be set small by simultaneously using the configuration in which the electrical transmission path 5 is used as the delay unit 6. Thus, the space can be further saved.

As described above, the delay unit 6 in the fifth configuration example has a function of having the waveform of the clock signal blunt compared to the waveform of the data signal for the signal input to the binarization signal generation unit 36. Thus, the delay unit 6 in the fifth configuration example can be expressed as a waveform adjustment unit for adjusting the waveform of the signal input to the binarization signal generation unit 36.

Sixth Configuration Example

Figure 18A:
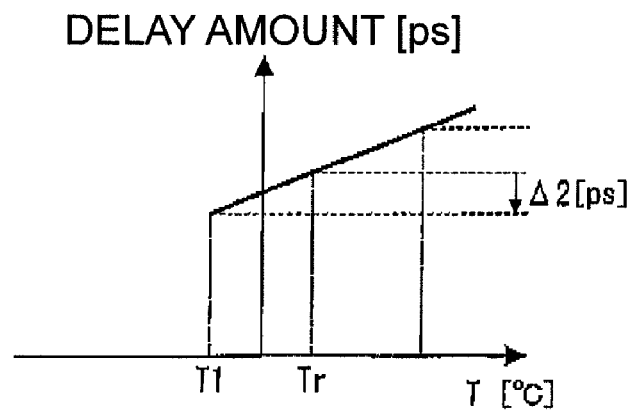
FIGS. 18A and 18B are views for describing the delay of the clock signal by the second delay unit, where
Figure 18B:
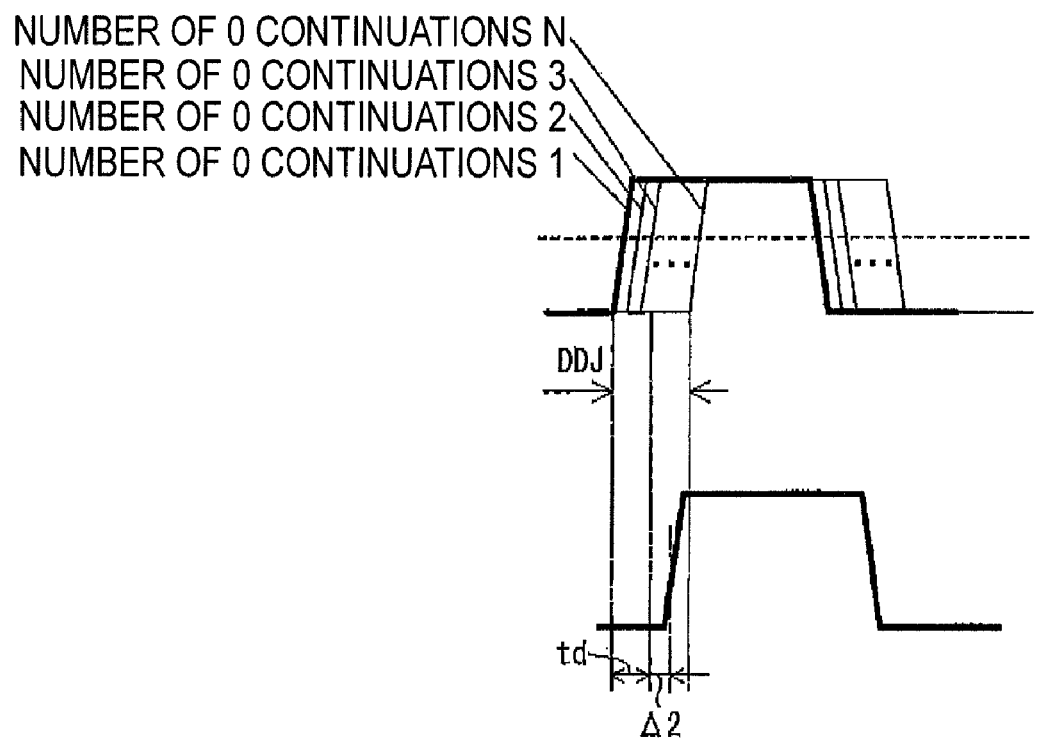

Generally, the IC used in the light transmitting unit 2 or the light receiving unit 3 of the light transmission module 1 tends to have the movement speed of electrons increase at a low temperature. Thus, in the electronic device mounted with the light transmission system 100, the delay amount of the data signal with respect to the clock signal in the light transmitting unit 2 and the light receiving unit 3 becomes small when the ambient temperature lowers. The light transmission system 100 may include a second delay unit for determining the delay amount of the clock signal based on the temperature characteristics of the signal delay of the light transmission module 1. FIGS. 18A and 18B are views for describing the delay of the clock signal by the second delay unit, where FIG. 18A is a graph showing the temperature characteristics of the signal delay of the light transmission module 1, and FIG. 18B is a timing chart showing a relationship of the data signal and the clock signal in the light transmission system 100 of the sixth configuration example.

As shown in FIG. 18A, the delay amount of the data signal with respect to the clock signal becomes larger as the temperature T rises. With the difference between the delay amount at the lower limit temperature $T_1$ in the usable temperature range of the light transmission module 1 and the delay amount at the normal temperature $T_r$ as $\Delta_2$, the second delay unit performs a process of delaying the clock signal by the delay amount $\Delta_2$ with respect to the data signal. A light transmission system 100 capable of maintaining a satisfactory signal transmission quality over a wide temperature range thus can be realized.

The light transmission system 100 may include both the delay unit 6 serving as the first delay unit and the second delay unit. In this case, as shown in FIG. 18B, the clock signal output from the reception processing unit 35 is delayed with respect to the data signal by the delay amount $\Delta_2$ by the second delay unit in addition to the delay amount $t_d$ by the first delay unit. Therefore, the distribution of the rise start time of the data signal due to the data dependency jitter with respect to the rise start time of the clock signal becomes a symmetrical distribution even at a temperature the skew specification is most strict. Thus, even if the number of bit continuations of the data signal is increased, the influence due to the data dependency jitter (DDJ) can be suppressed and a satisfactory signal transmission quality can be maintained over a wide temperature range.

Application Example

The light transmission system 100 according to one or more embodiments of the present invention can also be applied to the following application examples. In the embodiments described above, an example in which application is made to the foldable portable telephone 40 has been described as the application example, but this is not the sole case, in contrast the light transmission system 100 can be applied to the hinge portion etc. of the foldable electronic device such as the foldable PHS (Personal Handyphone System), foldable PDA (Personal Digital Assistant), and the foldable notebook computer.

High speed and large capacity communication can be realized in a limited space by applying the light transmission system 100 to such foldable electronic devices. Therefore, the light transmission system 100 is particularly suited to a device that requires high speed and large capacity data communication and that is demanded miniaturization such as a foldable liquid crystal display device. In such signal transmission, the clock signal transmitted through the electrical transmission path 5 is preferably at low speed.

Figure 19A:
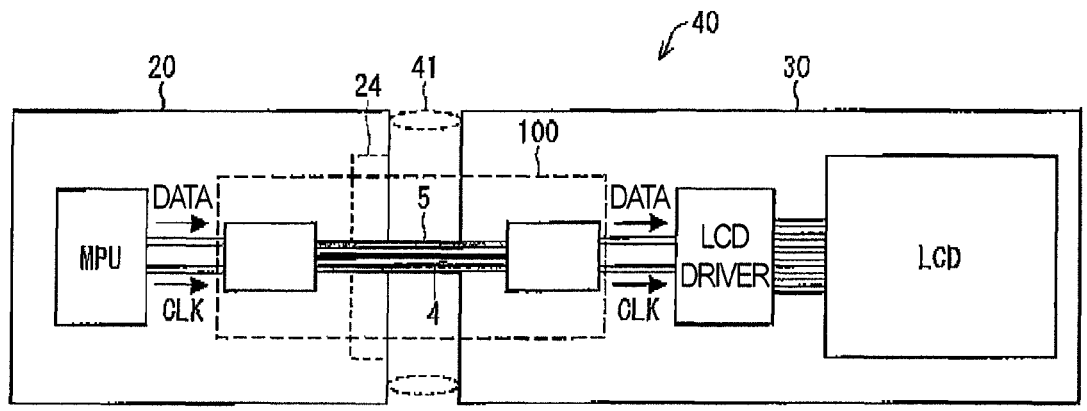
FIGS. 19A and 19B are block diagrams showing a configuration of a portable telephone in which an antenna is mounted at the hinge portion.
Figure 19B:
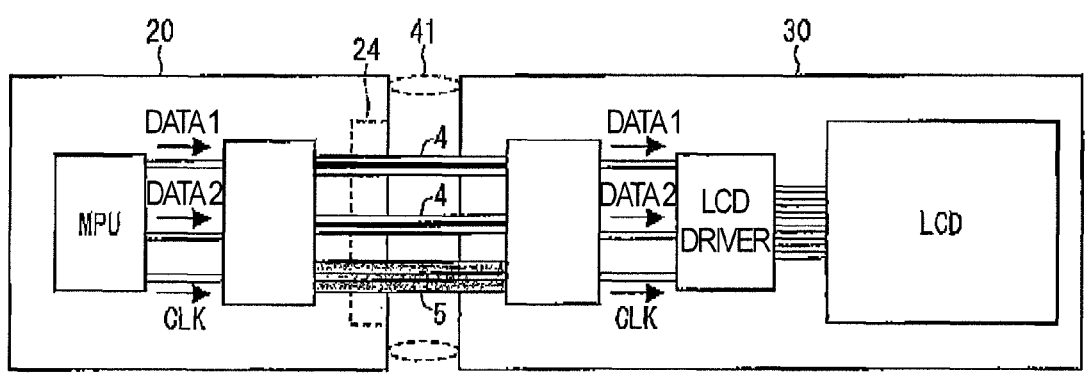

In recent foldable portable telephones, an antenna 24 is often mounted at the hinge portion 41, as shown in FIGS. 19A and 19B, to respond to various types of communication methods. Five or more antennas 24 are often mounted. In such case, if the main control board 20 and the application circuit board 30 are connected with a normal electrical wiring, the reception sensitivity of the antenna 24 degrades by the EMI generated from the electrical wiring.

In the foldable portable telephone mounted with the light transmission system 100, on the other hand, the EMI generated from the light transmission path 4 is zero, and the EMI generated from the electrical transmission path 5 through which the clock signal of low speed is transmitted is very small. Thus, the high speed data transmission can be realized without degrading the reception sensitivity of the antenna 24. In order to transmit data at a higher speed, the light transmission system 100 may have a configuration in which two or more light transmission paths 4 are mounted in correspondence with two or more data lanes, as shown in FIG. 19B.

As a further application example, the light transmission system 100 can be applied to a device with a drive unit such as the printer head of a printing device (electronics) or a reading portion of a hard disc recording/reproducing device.

Figure 20A:
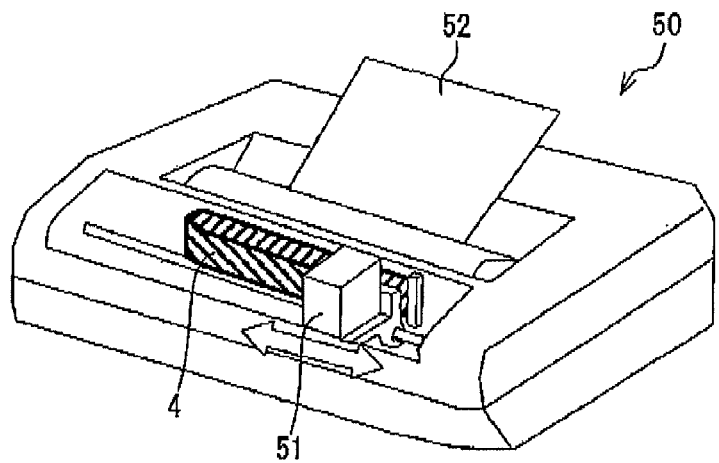
FIG. 20A is a perspective view showing an outer appearance of a printing device including the light transmission system according to one or more embodiments of the present invention.
Figure 20B:
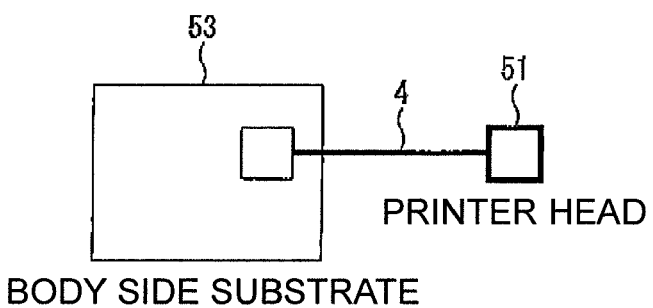
FIG. 20B is a block diagram showing the main parts of the printing device shown in FIG. 20A, and FIGS. 20C and 20D are perspective views showing a curved state of the light transmission path when the printer head is moved (driven) in the printing device.
Figure 20C:
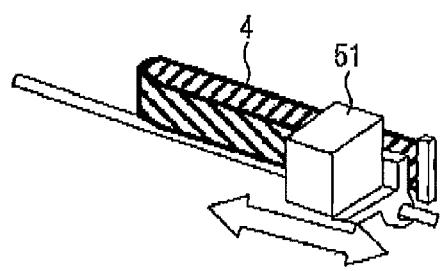

FIGS. 20A to 20C show an example in which the light transmission system 100 is applied to a printing device 50. FIG. 20A is a perspective view showing an outer appearance of a printing device 50. As shown in the figure, the printing device 50 includes a printer head 51 for performing printing on a paper 54 while moving in the width direction of the paper 54, and one end of the light transmission module 1 is connected to the printer head 51.

FIG. 20B is a block diagram of a portion applied with the light transmission system 100 in the printing device 50. As shown in the figure, one end of the light transmission system 100 is connected to the printer head 51, the other end is connected to the body side substrate in the printing device 50. The body side substrate includes a control unit for controlling the operation of each portion of the printing device 50.

Figure 20D:
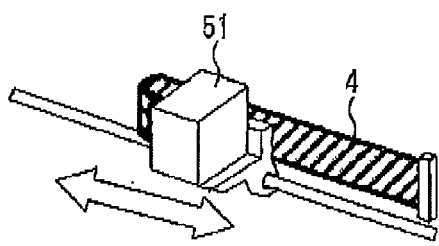

FIGS. 20C and 20D are perspective views showing a curved state of the light transmission path 4 when the printer head 51 is moved (driven) in the printing device 50. As shown in the figure, when the light transmission path 4 is applied to the drive unit such as the printer head 51, the curved state of the light transmission path 4 changes by the drive of the printer head 51 and each position of the light transmission path 4 is repeatedly curved.

Therefore, the light transmission system 100 according to one or more embodiments of the present invention is suited for such drive unit. The high speed and large capacity communication using the drive unit can be realized by applying the light transmission system 100 to the drive unit.

Figure 21:
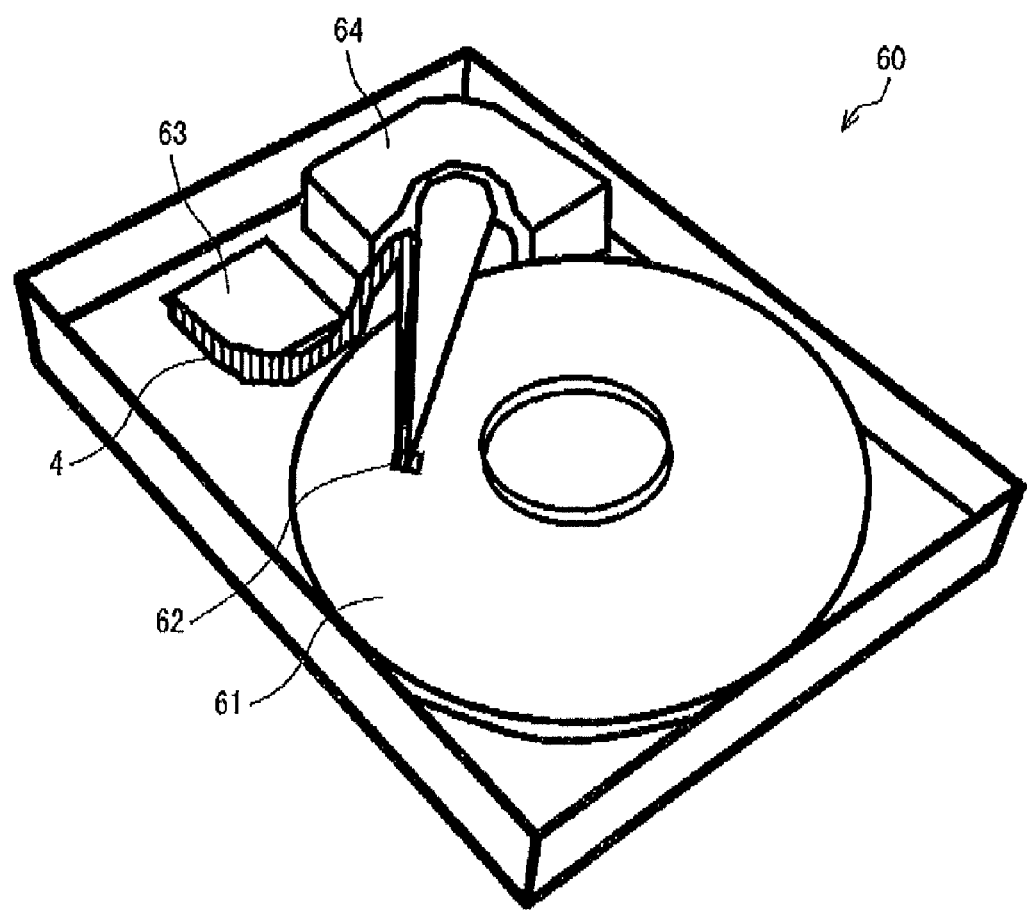
FIG. 21 is a perspective view showing an outer appearance of a hard disc recording and reproducing device including the light transmission system according to one or more embodiments of the present invention.
Figure 22:
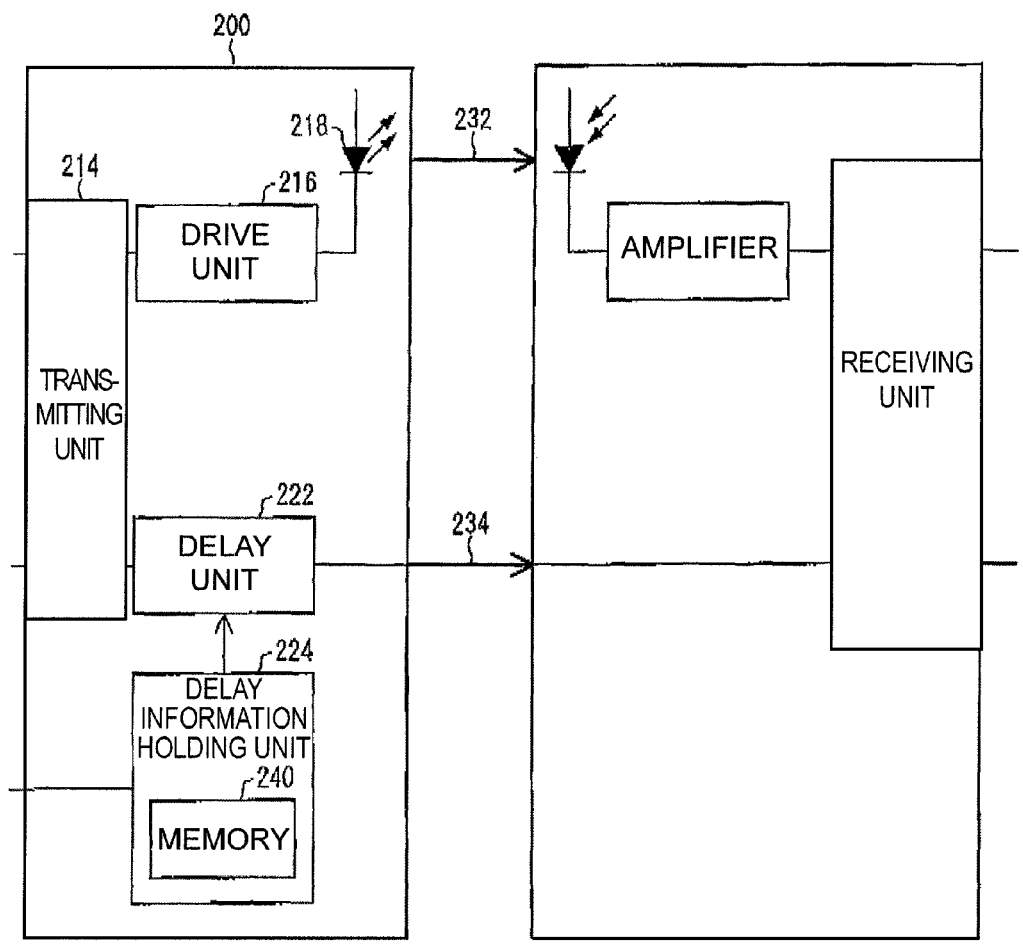
FIG. 22 is a block diagram showing a configuration of a transmission and reception device described in Japanese Unexamined Patent Publication No. 2007-124130.
Figure 23:
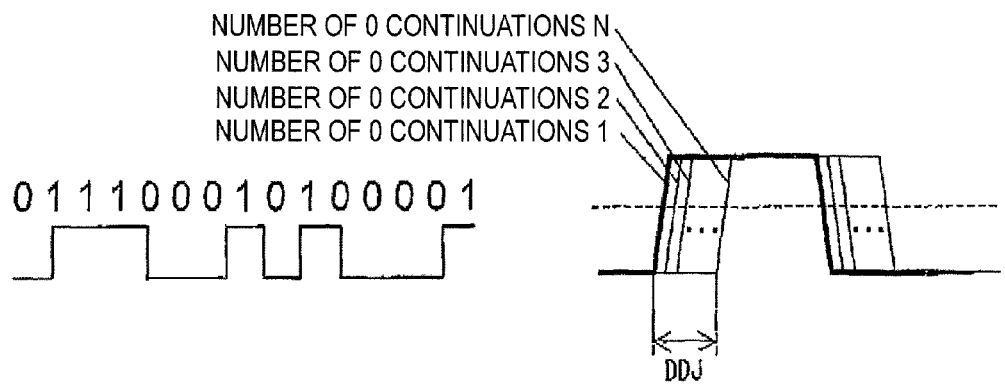
FIG. 23 is a schematic view schematically showing an occurrence of a data dependency jitter (DDJ) by bit continuation.
Figure 24A:
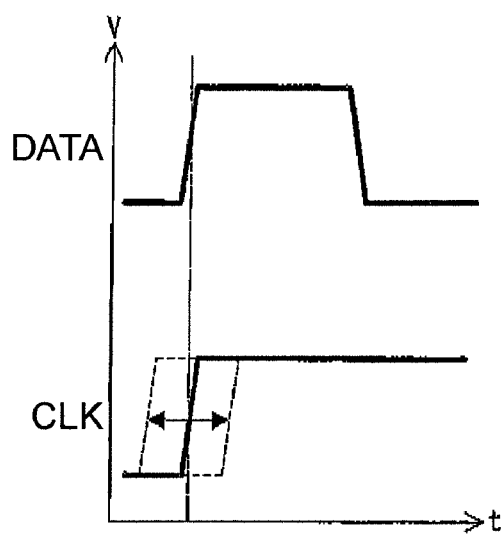
FIG. 24A is a timing chart showing a relationship of a data signal in which the data dependency jitter has not occurred and a clock signal.
Figure 24B:
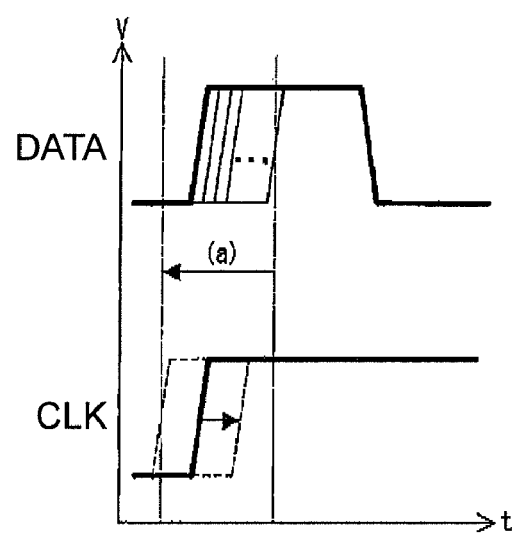
FIG. 24B is a timing chart showing a relationship of the data signal in which the data dependency jitter has occurred and the clock signal.

FIG. 21 shows an example in which the light transmission system 100 is applied to the hard disk recording/reproducing device 60.

As shown in the figure, the hard disk recording and reproducing device 60 includes a disk (hard disk) 61, a head (read/write head) 62, a substrate introducing portion 63, a drive portion (drive motor) 64, and the light transmission module 1.

The drive portion 64 drives the head 62 along a radial direction of the disk 61. The head 62 reads the information recorded on the disk 61 and writes information on the disk 61. The head 62 is connected to the substrate introducing portion 63 by way of the light transmission module 1, and propagates the information read from the disk 61 to the substrate introducing portion 63 as optical signal and receives the optical signal of the information to write to the disk 61 propagated from the substrate introducing portion 63.

Therefore, the high speed and large capacity communication using the drive unit can be realized by applying the light transmission module 1 to the drive unit such as the head 62 of the hard disc recording and reproducing device 60.

In addition to the above application examples, the light transmission system 100 according to one or more embodiments of the present invention can also be used in signal transmission between information terminals and substrates of a video camera, a notebook computer and the like.

The present invention is not limited to the above-described embodiments, and various modifications may be made within the scope of the Claims, where the embodiments obtained by appropriately combining the technical means described in the different embodiments are also encompassed in the technical scope of the present invention.

The light transmission system according to the present invention is also applicable to the light communication path between various types of devices, and is also applicable to a flexible optical wiring serving as an in-device wiring mounted in a small and thin consumer device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light transmission system comprising:
    a light transmission module comprising a light transmission path that transmits a data signal as an optical signal, wherein the light transmission module converts the optical signal transmitted through the light transmission path to an electrical signal and outputs the converted optical signal as a binarization signal;

an electrical transmission path that outputs a clock signal as a binarization signal;

a reception processing unit that performs a reception process on each of the data signal and the clock signal; and a first delay unit that delays a rise start time of the clock signal with respect to a rise start time of the data signal for the binarization signal, wherein a delay amount of the clock signal by the first delay unit is a time less than or equal to a maximum value of a data dependency jitter (DDJ), and wherein when fluctuation in a rise time of the data signal is a sum of a jitter (deterministic jitter) of deterministic component and a jitter (random jitter) of random component:

the deterministic jitter is a discrete function distributed according to a peak of a δ function defined for every number of bit continuations N of the data signal; and the delay amount is set between a peak time of a δ function in number of bit continuations 2 and a peak time of a δ function in number of bit continuations N−1.

2. The light transmission system according to claim 1, wherein the light transmission module comprises:

an amplifier that amplifies the converted electrical signal, and a first binarization signal generation unit that compares a level of an input signal and a level of a first threshold value, and generates a binarization signal having a signal of high level and a signal of low level for the data signal based on a comparison result;

wherein a maximum value DDJ(max) of the DDJ is expressed with following equation (I):

$$DDJ(max) = \frac{5}{6} \times tr \times \frac{V_{th}}{V_{in}} \times \frac{1}{G_{max}\left\{\frac{G_{max}}{\alpha \log(Nf_{min}/f_T)} - 1\right\}}, \quad (I)$$

where $V_{in}$ is ½ of a voltage amplitude of the electrical signal input to the amplifier, $V_{th}$ is the first threshold value, $G_{max}$ is a maximum value of a gain of the amplifier, α is an increasing rate of a gain with respect to a transmission frequency in the amplifier, $f_T$ is a fundamental frequency of the data signal, $f_{min}$ is a transmittable rate of the light transmission module, tr is the rise time of the data signal, and N is a maximum value of the number of continuing bits in the data signal.

3. The light transmission system according to claim 2, wherein the light transmission module comprises:

a light transmitting unit that converts the data signal to the optical signal, and transmits the optical signal; and a light receiving unit that receives the optical signal transmitted through the light transmission path, and converts the optical signal to an electrical signal, wherein the first delay unit is an electrical transmission path, and wherein a wiring length $L_2$ of the electrical transmission path satisfies equation (1):

$$T(ic1) + T(ic2) + \frac{nL_1}{c} + \frac{DDJ(max)}{A} = \frac{L_2\sqrt{\varepsilon r}}{c}, \quad (1)$$

where t(ic1) and t(ic2) are signal delay times with respect to the clock signal of the light transmitting unit and the light receiving unit, respectively, $L_1$ is a wiring length of the light transmission path, $L_2$ is a wiring length of an electrical transmission path, n is an index of refraction of the light transmission path, c is a speed of light, sr is a relative permittivity of the electrical transmission path, DDJ(max) is the maximum value of the DDJ, and DDJ(max)/A is the delay amount.

4. The light transmission system according to claim 3, further comprising:

an integrated substrate that integrates the electrical transmission path, wherein the electrical transmission path is arranged parallel to a signal transmission direction of the light transmission path, wherein the wiring length of the electrical transmission path is longer than the wiring length of the light transmission path, and a length in the signal transmission direction of the integrated substrate is equal to the wiring length of the light transmission path.

5. The light transmission system according to claim 4, wherein the electrical transmission path is arranged to reciprocate at least once at one end in the signal transmission direction of the integrated substrate.

6. The light transmission system according to claim 4, wherein the integrated substrate comprises a projection that projects out in the signal transmission direction from the light transmission path, wherein the light transmission module is mounted on the projection, wherein the projection comprises an electrical wiring layer in which an electrical wiring is pattern-formed, and wherein the electrical wiring of the electrical wiring layer and the electrical transmission path are connected.

7. The light transmission system according to claim 4, further comprising:

a connector comprising a connector terminal;

wherein a plurality of electrical transmission paths is coaxially arranged on the integrated substrate, wherein each electrical transmission path is connected with the connector terminal, wherein the connector comprises a connector short-circuit portion that short circuits the connector terminals, and wherein the connector short-circuit portion is arranged to transmit the clock signal in a reciprocating manner on an input side and an output side of the electrical transmission path.

8. The light transmission system according to claim 2, wherein the first delay unit comprises a second binarization signal generation unit that compares a level of the input signal and a level of a second threshold value, and generates a binarization signal having a signal of high level and a signal of low level for the clock signal based on a comparison result, and wherein, in the second binarization signal generation unit, the level of the second threshold value with respect to the clock signal is set higher than the level of the first threshold value with respect to the data signal.

9. The light transmission system according to claim 8, wherein, when the rise time tr and the amplitude of the data signal are equal to the rise time of the clock signal, ½ of the amplitude of the data signal and the clock signal is \$T_{od}$, the difference between the first threshold value and the second threshold value is $\Delta V_{th}$, and the delay amount is $t_d$, the delay amount $t_d$ satisfies equation (2):

$$t_d = \frac{5}{6} \times tr \times \frac{\Delta V_{th}}{V_{od}}. \quad (2)$$

10. The light transmission system according to claim 2, wherein the first delay unit comprises: a second binarization signal generation unit that compares a level of the input signal and a level of a threshold value, and generates a binarization signal having a signal of high level and a signal of low level for the clock signal based on a comparison result, and
wherein the first delay unit performs a process of extending the rise time of the clock signal to be longer than the rise time of the data signal with respect to the signal input to the second binarization signal generation unit.

11. The light transmission system according to claim 10, wherein the amplitudes of the data signal and the clock signal are equal to each other, and
wherein, when ½ of the amplitude is $V_{od}$, the difference between the rise time of the data signal and the rise time of the clock signal is $\Delta tr$, the first threshold value is $V_{th}$, and the delay amount is $t_d$, the delay amount $t_d$ satisfies equation (3):

$$t_d = \frac{5}{6} \times \Delta tr \times \left(1 + \frac{V_{th}}{V_{od}}\right). \quad (3)$$

12. The light transmission system according to claim 1, wherein the delay amount is between ¼ and ¾ of the maximum value of the DDJ.

13. The light transmission system according to claim 12, wherein the delay amount is ½ of the maximum value of the DDJ.

14. An electronic device comprising the light transmission system according to claim 1.

15. A light transmission system comprising:
a light transmission module comprising a light transmission path that transmits a data signal as an optical signal, wherein the light transmission module converts the optical signal transmitted through the light transmission path to an electrical signal and outputs the converted optical signal as a binarization signal;
an electrical transmission path that outputs a clock signal as a binarization signal;
a reception processing unit that performs a reception process on each of the data signal and the clock signal; and
a first delay unit that delays a rise start time of the clock signal with respect to a rise start time of the data signal for the binarization signal,
wherein a delay amount of the clock signal by the first delay unit is a time less than or equal to a maximum value of a data dependency jitter (DDJ),
wherein the light transmission system further comprises:
a second delay unit that delays the rise start time of the clock signal, and
wherein the delay amount of the clock signal by the second delay unit is a difference between the delay amount of the data signal with respect to the clock signal at a lower limit temperature in a usable temperature range and the delay amount of the data signal with respect to the clock signal at a normal temperature in temperature characteristics of the light transmission module.

\* \* \* \* \*

UNITED STATES PATENT AND TRADEMARK OFFICE
CERTIFICATE OF CORRECTION

PATENT NO. : 8,346,094 B2
APPLICATION NO. : 12/621150
DATED : January 1, 2013
INVENTOR(S) : Kentaro Hamana et al.

It is certified that error appears in the above-identified patent and that said Letters Patent is hereby corrected as shown below:

On the Title page:

1. Item (75) Inventors, the physical address of Hayami Hosokawa is listed as "Kyoto" and should read as -- Tsuzuki-gun --.

In the Claims:

2. At column 28, claim 3, line 6, a word "sr" should read -- er --.

3. At column 28, claim 9, line 66, the words "\Tod" should read -- Vod, --.

Signed and Sealed this
Seventh Day of May, 2013

Teresa Stanek Rea
*Acting Director of the United States Patent and Trademark Office*